(12) United States Patent
Carlson et al.

(10) Patent No.: US 7,614,227 B2
(45) Date of Patent: Nov. 10, 2009

(54) ROTARY CONTROL VALVE FOR A HYDROSTATIC TRANSMISSION

(75) Inventors: Robert Carlson, Hudson, WI (US); Thomas W. Roeber, Yarmouth, ME (US); Omid Ghayebi, South Portland, ME (US)

(73) Assignee: Briggs and Stratton Corporation, Wauwatosa, WI (US)

( * ) Notice: Subject to any disclaimer, the term of this patent is extended or adjusted under 35 U.S.C. 154(b) by 332 days.

(21) Appl. No.: 11/831,058

(22) Filed: Jul. 31, 2007

(65) Prior Publication Data

US 2008/0028759 A1 Feb. 7, 2008

Related U.S. Application Data

(60) Provisional application No. 60/821,446, filed on Aug. 4, 2006.

(51) Int. Cl.
F16H 47/04 (2006.01)
F16H 39/00 (2006.01)

(52) U.S. Cl. .......................... 60/493; 60/487
(58) Field of Classification Search .................. 60/487, 60/454, 493, 494, 489
See application file for complete search history.

(56) References Cited

U.S. PATENT DOCUMENTS

| | | |
|---|---|---|
| 1,783,780 A | 12/1930 | Evans |
| 1,792,485 A | 2/1931 | Fawick |
| 2,099,630 A | 11/1937 | Schneider |
| 2,645,901 A | 7/1953 | Elkins |
| 2,712,857 A | 7/1955 | Jackson |
| 2,924,287 A | 2/1960 | Bramley |
| 3,166,905 A | 1/1965 | Budzich et al. |
| 3,412,631 A | 11/1968 | Frost |
| 3,508,401 A | 4/1970 | Aplin |
| 3,633,623 A | 1/1972 | Perry et al. |
| 3,641,765 A | 2/1972 | Hancock et al. |
| 3,672,167 A | 6/1972 | Griesenbrock |
| 3,680,652 A | 8/1972 | Greene |
| 3,698,189 A | 10/1972 | Reimer |
| 3,704,588 A | 12/1972 | Trabbic |
| 3,737,000 A | 6/1973 | Knobloch et al. |
| 3,805,526 A | 4/1974 | Charron |
| 3,811,525 A | 5/1974 | Stuart |
| 3,829,258 A | 8/1974 | Easton |
| 3,864,916 A | 2/1975 | Maistrelli et al. |
| 3,905,728 A | 9/1975 | Swedberg |
| 3,940,805 A | 3/1976 | Sievers |
| 3,995,978 A | 12/1976 | Khan et al. |
| 4,075,843 A | 2/1978 | Leker |
| 4,341,133 A | 7/1982 | Sakamoto |
| 4,373,605 A | 2/1983 | Sheppard, Sr. |
| 4,432,387 A | 2/1984 | Sims |
| 4,493,189 A * | 1/1985 | Slater .......................... 60/489 |
| 4,502,558 A | 3/1985 | Mauri |
| 4,598,546 A | 7/1986 | Van Kanegan |

(Continued)

Primary Examiner—Thomas E Lazo
(74) Attorney, Agent, or Firm—Michael Best & Friedrich LLP

(57) ABSTRACT

A rotary control valve for a vehicle hydrostatic transmission includes a hydraulic pump and a hydraulic motor. The valve is configured to control both a direction and a speed of the hydrostatic transmission. The rotary control valve includes a rotary valve plate configured to oscillate through a range of less than 180 degrees independently of the pump and the motor.

16 Claims, 29 Drawing Sheets

U.S. PATENT DOCUMENTS

| | | | |
|---|---|---|---|
| 4,606,428 A | 8/1986 | Giere | |
| 4,651,592 A | 3/1987 | Edwards | |
| 4,653,345 A | 3/1987 | Edwards | |
| 4,656,886 A | 4/1987 | Edwards | |
| 4,726,256 A | 2/1988 | von Kaler et al. | |
| 4,794,756 A | 1/1989 | Iseman | |
| 4,846,212 A | 7/1989 | Scobie et al. | |
| 4,968,227 A | 11/1990 | Szulczewski et al. | |
| 4,990,126 A | 2/1991 | Ideta et al. | |
| 5,000,056 A | 3/1991 | Crawford et al. | |
| 5,018,351 A | 5/1991 | Otte | |
| 5,033,564 A | 7/1991 | Mattson | |
| 5,052,511 A | 10/1991 | Hunt | |
| 5,067,933 A | 11/1991 | Hardesty et al. | |
| 5,117,936 A | 6/1992 | Nakamura et al. | |
| 5,137,100 A | 8/1992 | Scott et al. | |
| 5,145,019 A | 9/1992 | Sebben et al. | |
| 5,146,748 A | 9/1992 | Okada | |
| 5,158,150 A | 10/1992 | Askeland et al. | |
| 5,159,992 A | 11/1992 | Reinecke et al. | |
| 5,205,123 A | 4/1993 | Dunstan | |
| 5,235,810 A | 8/1993 | Havens | |
| 5,239,827 A | 8/1993 | Havens | |
| 5,370,588 A | 12/1994 | Sawase et al. | |
| RE34,822 E | 1/1995 | Mattson | |
| 5,400,671 A | 3/1995 | Hall et al. | |
| 5,440,878 A | 8/1995 | Gleasman et al. | |
| 5,501,640 A | 3/1996 | Hauser et al. | |
| 5,560,447 A | 10/1996 | Ishii et al. | |
| 5,592,818 A | 1/1997 | Haag et al. | |
| 5,622,051 A | 4/1997 | Iida et al. | |
| 5,624,248 A | 4/1997 | Kassen et al. | |
| 5,634,526 A | 6/1997 | Johnson | |
| 5,664,465 A | 9/1997 | Okada et al. | |
| 5,809,781 A | 9/1998 | Krantz | |
| 5,820,505 A | 10/1998 | Parker | |
| 5,878,724 A | 3/1999 | Channing | |
| 5,950,500 A | 9/1999 | Okada et al. | |
| 5,992,150 A | 11/1999 | Eberle | |
| 6,109,032 A | 8/2000 | Shimizu et al. | |
| 6,151,990 A | 11/2000 | Johnson et al. | |
| 6,158,465 A | 12/2000 | Lambert et al. | |
| 6,195,990 B1 | 3/2001 | Machesney et al. | |
| 6,196,348 B1 | 3/2001 | Yano et al. | |
| 6,202,783 B1 | 3/2001 | Taylor et al. | |
| 6,318,080 B2 | 11/2001 | Hauser et al. | |
| 6,341,488 B1 | 1/2002 | Shimizu et al. | |
| 6,354,975 B1 | 3/2002 | Thoma | |
| 6,357,479 B1 | 3/2002 | Wagner et al. | |
| 6,367,572 B1 | 4/2002 | Maletschek et al. | |
| 6,371,149 B1 | 4/2002 | Gust et al. | |
| 6,378,300 B1 | 4/2002 | Johnson et al. | |
| 6,401,854 B2 | 6/2002 | Yano et al. | |
| 6,422,109 B1 | 7/2002 | Jolliff et al. | |
| 6,427,442 B2 | 8/2002 | Thoma et al. | |
| 6,477,838 B1 | 11/2002 | Thoma et al. | |
| 6,487,857 B1 | 12/2002 | Poplawski et al. | |
| 6,487,935 B2 | 12/2002 | Hauser et al. | |
| 6,513,325 B2 | 2/2003 | Shimizu et al. | |
| 6,530,218 B2 | 3/2003 | Saito et al. | |
| 6,539,713 B2 | 4/2003 | Johnson et al. | |
| 6,543,560 B1 | 4/2003 | Trefz et al. | |
| 6,550,243 B2 | 4/2003 | Hauser et al. | |
| 6,564,550 B2 | 5/2003 | Thoma et al. | |
| 6,688,418 B2 | 2/2004 | Bohrer | |
| 6,796,121 B2 | 9/2004 | Thoma et al. | |
| 6,827,562 B1 | 12/2004 | Barto | |
| 6,860,106 B2 | 3/2005 | Takada et al. | |
| 2001/0000562 A1 | 5/2001 | Abend et al. | |
| 2003/0061901 A1 | 4/2003 | Carlson et al. | |
| 2003/0062212 A1 | 4/2003 | Samejima et al. | |
| 2003/0070429 A1 | 4/2003 | Jolliff et al. | |
| 2003/0173133 A1 | 9/2003 | Kempt et al. | |
| 2003/0186772 A1 | 10/2003 | Grogg et al. | |
| 2004/0214685 A1 | 10/2004 | Korenjak et al. | |
| 2004/0247473 A1 | 12/2004 | Barto | |

\* cited by examiner

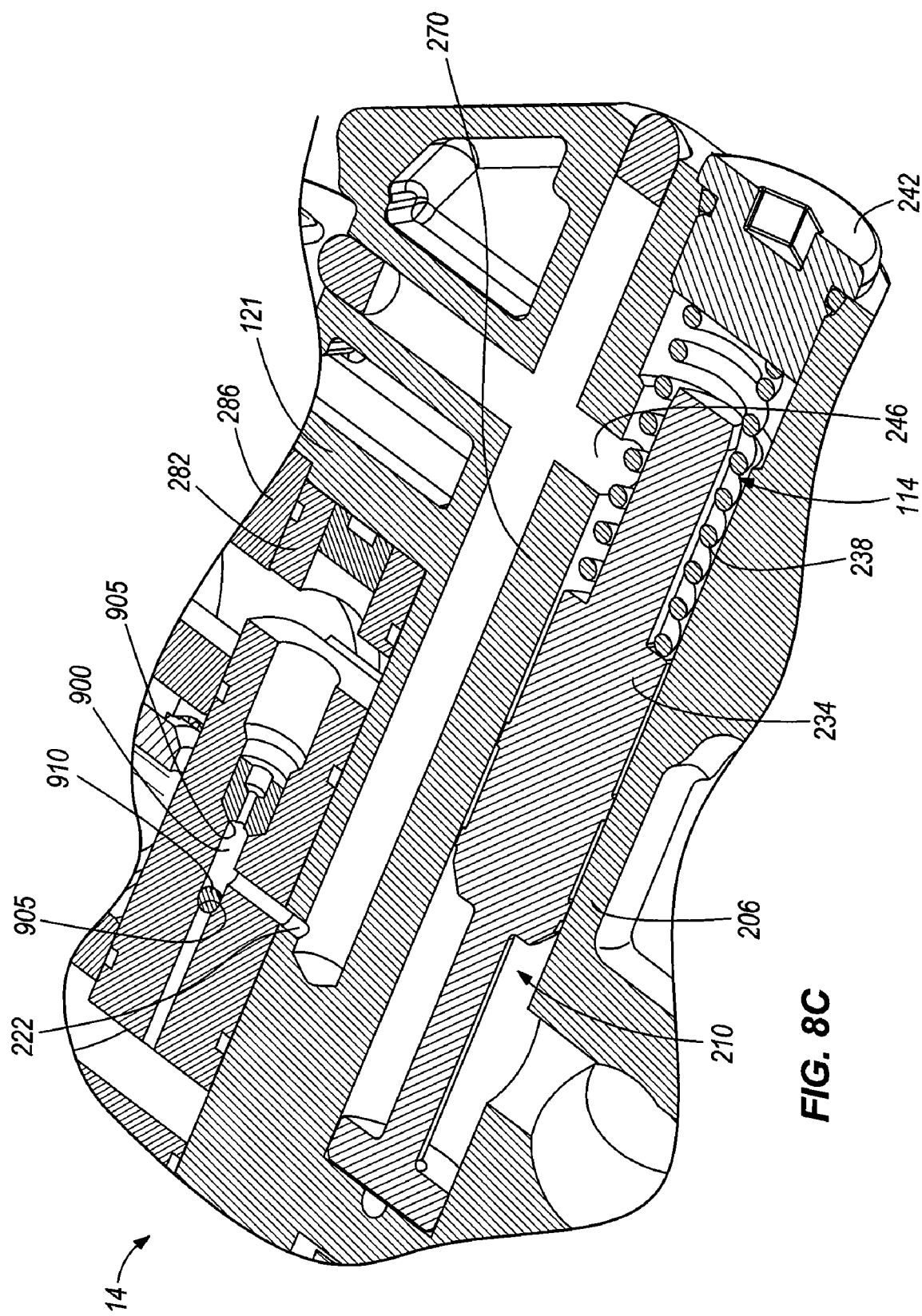

ROTARY CONTROL VALVE FOR A HYDROSTATIC TRANSMISSION

RELATED APPLICATION DATA

This application claims benefit under 35 U.S.C. Section 119(e) of U.S. Provisional Application No. 60/821,446, filed Aug. 4, 2006, which is fully incorporated herein by reference.

BACKGROUND

The present invention relates to hydrostatic transmissions.

Hydrostatic transmissions are commonly used in lawn tractors and other small vehicles to cause movement of the drive wheels. Hydrostatic drive trains often include a number of components, such as a hydraulic motor, a reduction unit, a clutch unit, an oil pump and an oil reservoir.

SUMMARY

In one embodiment, the invention provides a rotary control valve for a vehicle hydrostatic transmission. The hydrostatic transmission has a hydraulic pump and a hydraulic motor. The valve is configured to control both a direction and a speed of the hydrostatic transmission. The rotary control valve includes a rotary valve plate configured to oscillate through a range of less than 180 degrees independently of the pump and the motor.

In another embodiment, the invention provides a hydrostatic transmission for a vehicle. The hydrostatic transmission includes a fluid pump, a fluid motor, and a rotary control valve configured to oscillate independent of the movement of the pump and the motor. A single control interface is configured to control both a speed and a direction of the motor.

In yet another embodiment, the invention provides a transmission that includes a pump configured to discharge a flow of fluid at a first pressure and a first valve configured to direct a portion of the flow of fluid to a first flow path and the remainder of the flow of fluid to a second flow path. A motor is configured to rotate in response to the flow of fluid in the first flow path and a second valve is configured to move between a first position and a second position in response to the first pressure. As the valve moves toward the second position, additional flow is diverted from the second flow path to the first flow path to increase the speed of the motor.

In another embodiment, the invention provides a hydrostatic transmission module for use with a small engine. The hydrostatic transmission module includes a module housing having a first chamber, and a second chamber in fluid communication with the first chamber. A fixed displacement pump is disposed in the first chamber of the module housing. The fixed displacement pump is operatively coupled to a crankshaft of the engine and configured to discharge a flow of fluid. A fixed displacement motor is disposed in the second chamber of the module housing. The motor is configured to rotate in response to the flow of fluid from the pump. The transmission module also includes a fluid flow path between the pump and the motor. The fluid flow path is integrated into the module housing. A valve is configured to direct a portion of the flow of fluid from the fluid flow path to the motor and a remainder of the flow of fluid from the fluid flow path to a bypass flow path. The motor is configured to rotate in response to the flow of fluid to the motor.

Other aspects of the invention will become apparent by consideration of the detailed description and accompanying drawings.

BRIEF DESCRIPTION OF THE DRAWINGS

FIG. 8C is an enlarged view of the flow compensating valve shown in FIG. 8A, the flow compensating valve in a low pressure mode.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
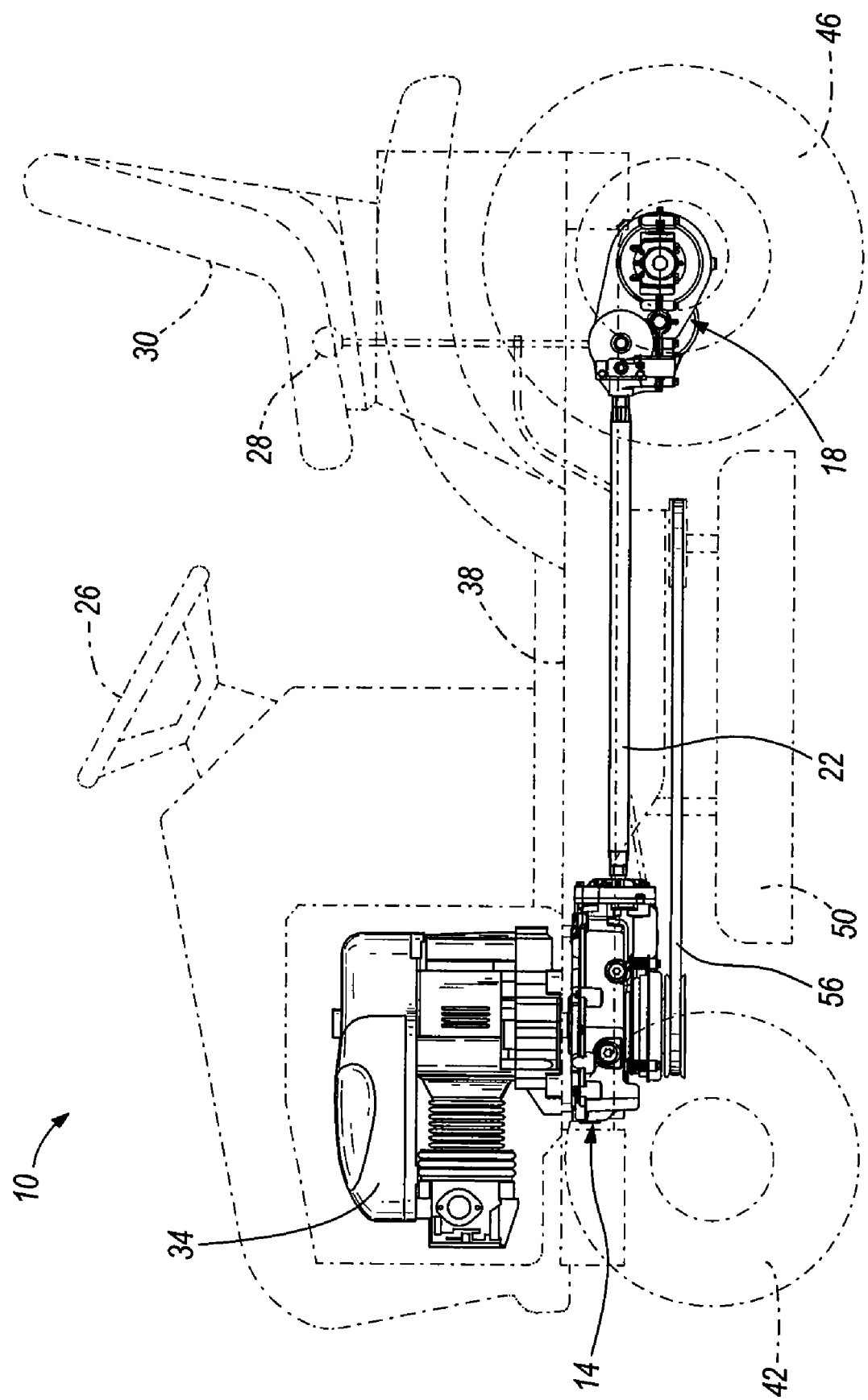
FIG. 1 is a schematic diagram of a riding lawn tractor including a hydrostatic transmission module and differential according to one embodiment of the present invention.

FIG. 1 illustrates a riding lawn tractor 10 including a hydrostatic transmission module 14 according to one embodiment of the invention, and a differential 18 interconnected with the hydrostatic transmission module 14 by a drive shaft 22. Although the illustrated hydrostatic transmission module 14 is used with the riding lawn tractor 10 in FIG. 1, it should be readily apparent to those of skill in the art that the hydrostatic transmission module 14 may be used with other vehicles that employ small engines (i.e., generally one or two cylinder engines). The lawn tractor 10 includes a steering wheel 26, a directional lever 28, a driver's seat 30 and an engine 34 mounted on a vehicle frame 38. The frame 38 is supported by front wheels 42 and driven rear wheels 46, and a mower deck 50 is mounted to an underside of the frame 38.

Figure 2:
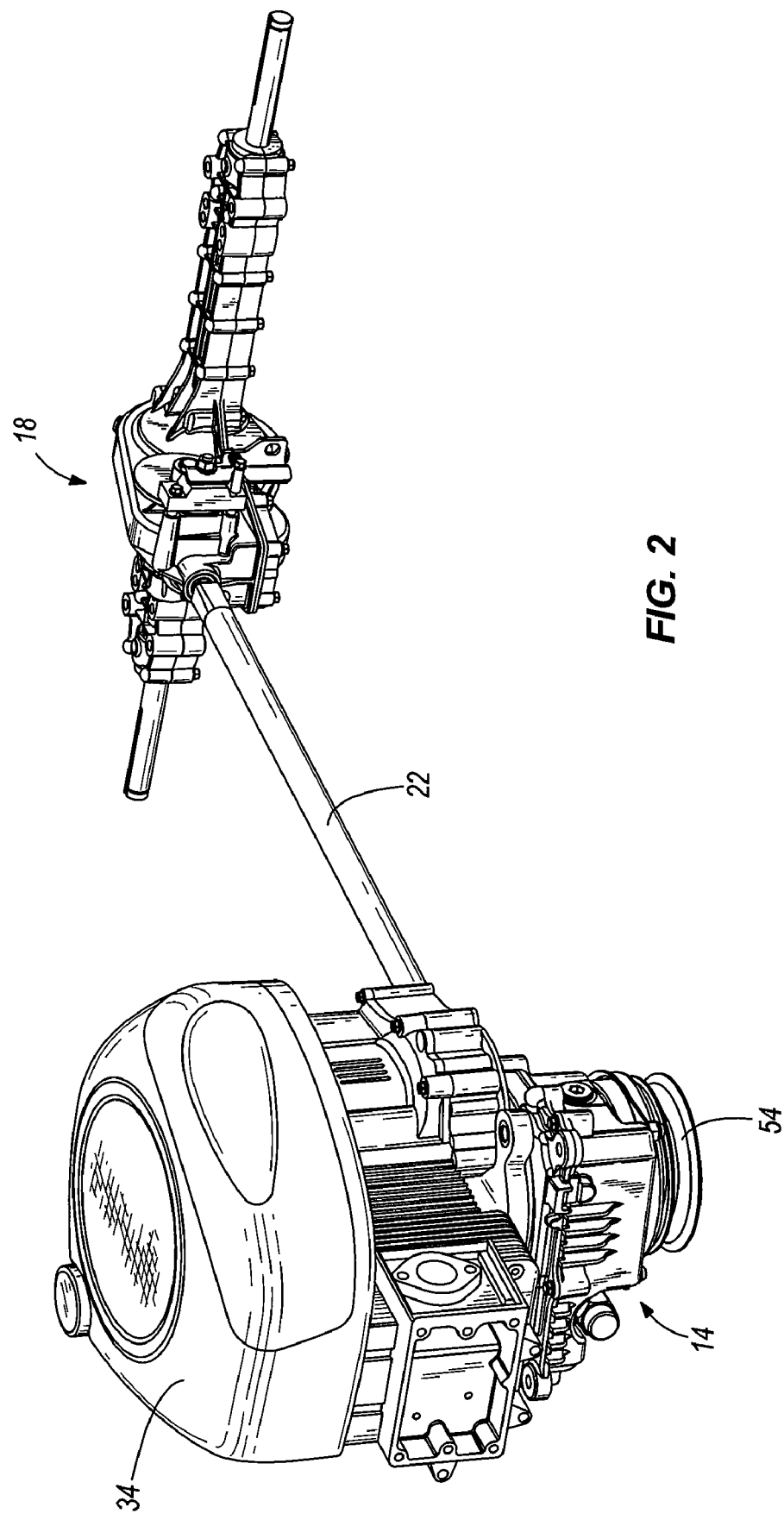
FIG. 2 is a perspective view of the hydrostatic transmission module and differential shown in FIG. 1.

FIG. 2 illustrates the engine 34, the hydrostatic transmission module 14, and the differential 18. Referring to FIGS. 1 and 2, the engine 34 is a vertical output shaft type having a vertical crankshaft (not shown) to which an output pulley 54 is interconnected via the hydrostatic transmission module 14 (see also FIG. 6). The crankshaft of the engine 34 is coupled to and mounted co-axially with a pump shaft 58 (FIG. 3), or input shaft, of the hydrostatic transmission module 14. In the illustrated embodiment, the crankshaft extends through the pump shaft 58 to engage the output pulley 54, as discussed below. The output pulley 54 is generally coupled to an input pulley on the mower deck 50 by a drive belt 56, as is known in the art. Driving power from the engine 34 is transmitted from the output pulley 54 to the input pulley (not shown) to drive one or more mower blades supported beneath the mower deck 50. Although the illustrated hydrostatic transmission module 14 is configured for use with a vertical output shaft type engine, it should be readily apparent to those of skill in the art that the hydrostatic transmission may be configured for use with a horizontal output shaft type engine.

One end of the drive shaft 22 is coupled to and mounted co-axially to a motor shaft 62 (FIG. 3), or output shaft, of the hydrostatic transmission module 14, and an opposite end of the drive shaft 22 is coupled to the differential 18. The differential 18 contains one or more axle shafts to which the rear wheels 46 are attached. The differential 18 allows power to be transmitted to both rear wheels 46 during a turn even though one of the wheels will travel a greater distance, and therefore must rotate faster, during the turn than the other wheel.

Figure 3:
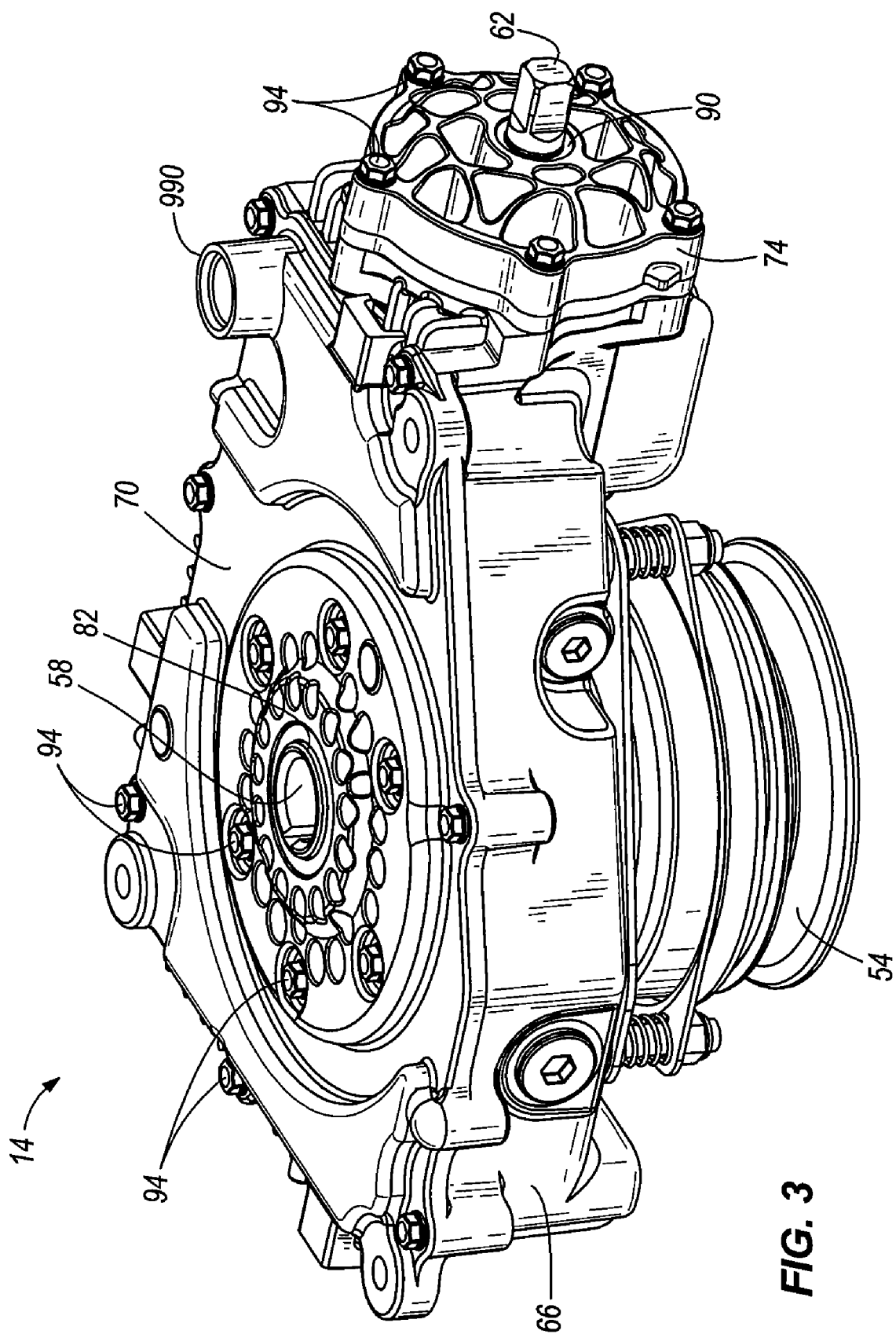
FIG. 3 is a top perspective view of the hydrostatic transmission module shown in FIG. 1.

FIG. 3 illustrates one embodiment of the hydrostatic transmission module 14, which integrates and houses all the components for a hydrostatic transmission in a single housing. The single housing enables modularity of the hydrostatic transmission and a transmission design that may be used with a variety of vehicle and engine types as a packaged unit. By integrating all the components of the hydrostatic transmission, the module provides a common housing for storing components of the hydrostatic transmission, which decreases the difficulty and cost of manufacturing, increases durability of the hydrostatic transmission, and decreases leakage of the hydrostatic transmission.

The hydrostatic transmission module 14 includes a housing 66, a first removable cover 70, and a second removable cover 74. The first cover 70 encloses a first chamber 78 (FIG. 4) of the housing 66 and includes an opening 82 for allowing the pump shaft 58 of the hydrostatic transmission 14 to pass. The second cover 74 encloses a second chamber 86 (FIG. 18) of the housing 66 and includes an opening 90 for allowing the motor shaft 62 of the hydrostatic transmission 14 to pass. Both covers 70, 74 are secured to the housing by bolt fasteners 94, although other conventional fasteners may be used, such as screws, pins, clips, clamps, inter-engaging elements, or the like.

Figure 4:
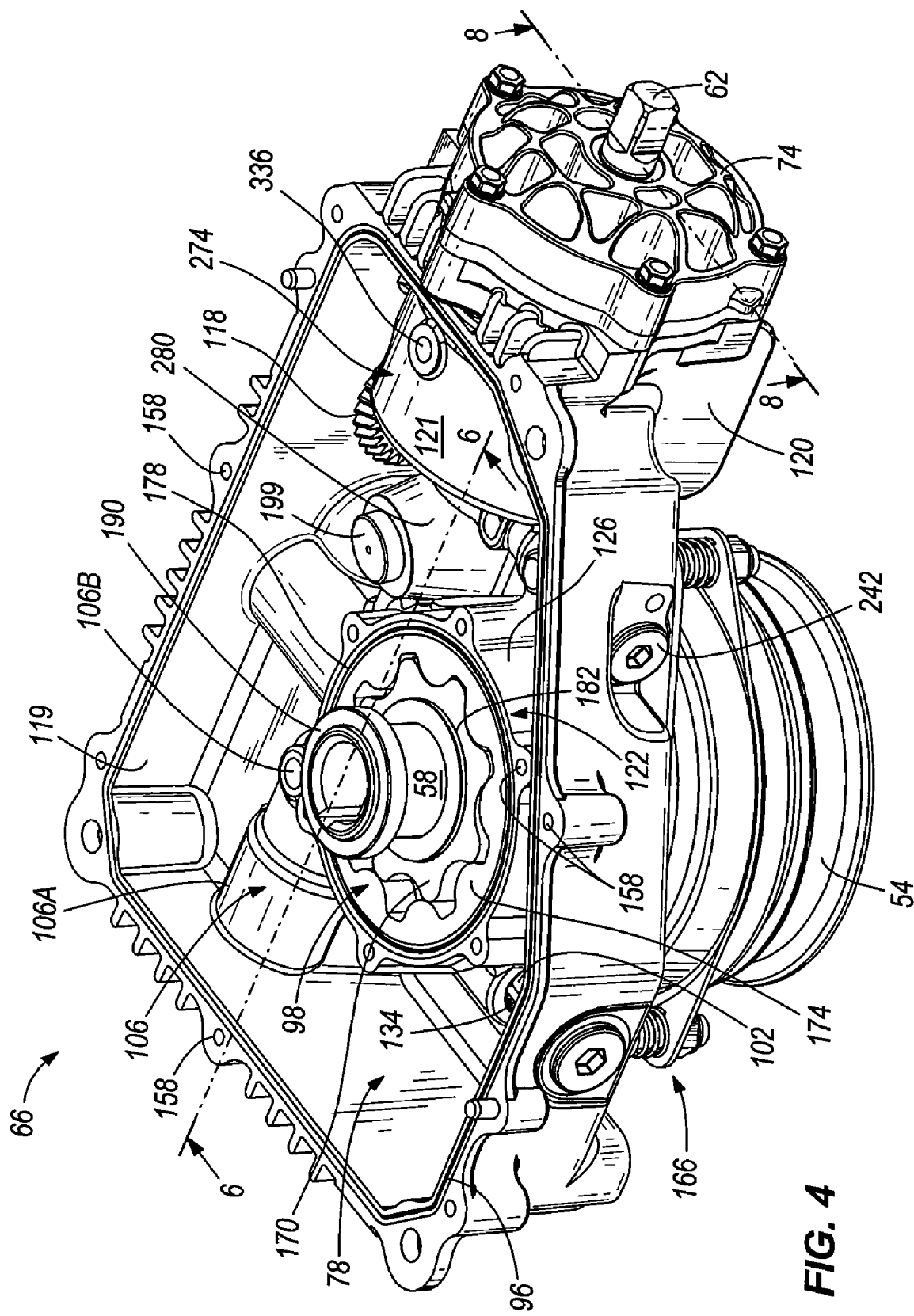
FIG. 4 is a top perspective view of the hydrostatic transmission module shown in FIG. 3 with a housing cover removed.
Figure 5:
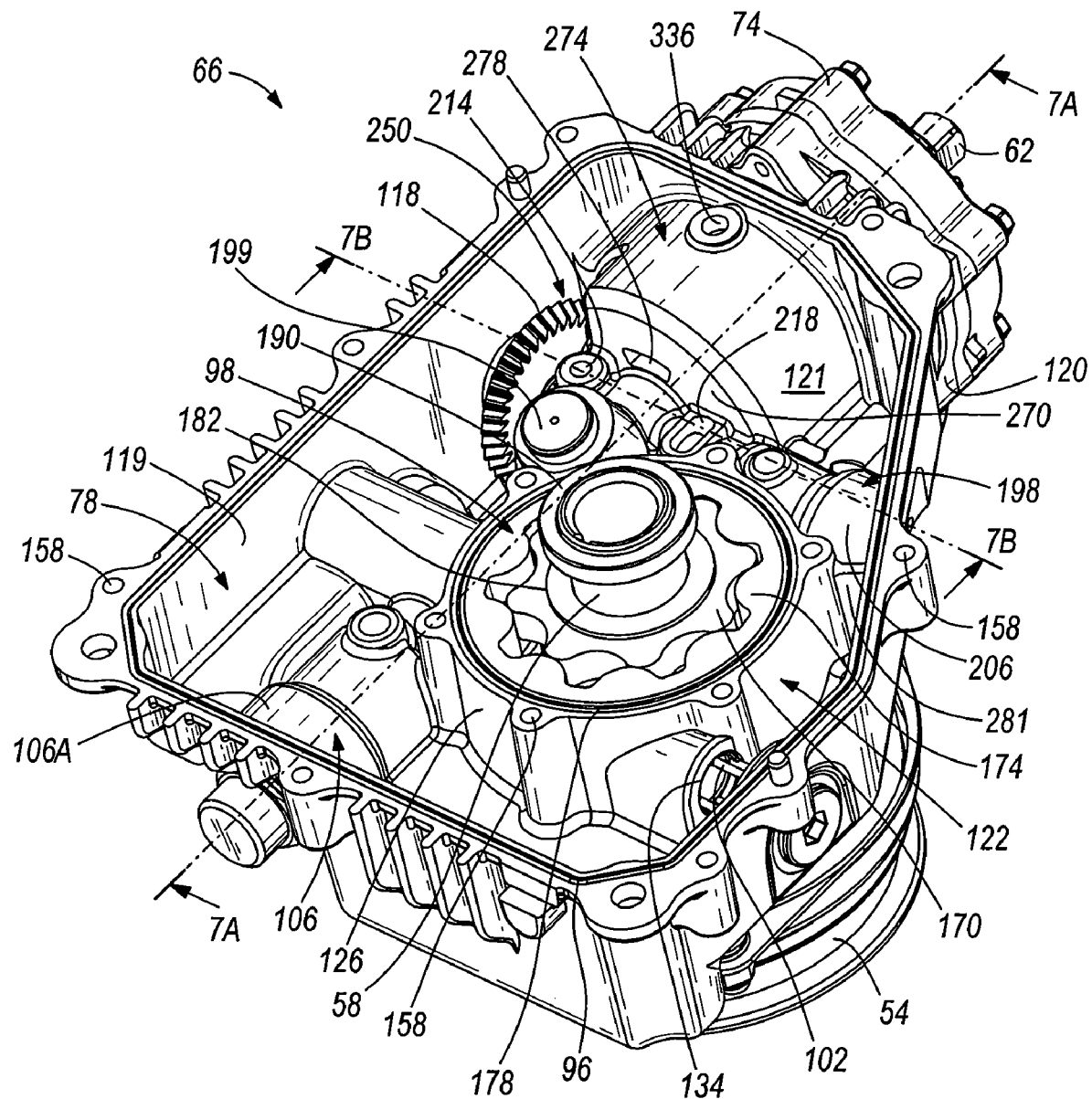
FIG. 5 is a front perspective view of the hydrostatic transmission module shown in FIG. 4.
Figure 12:
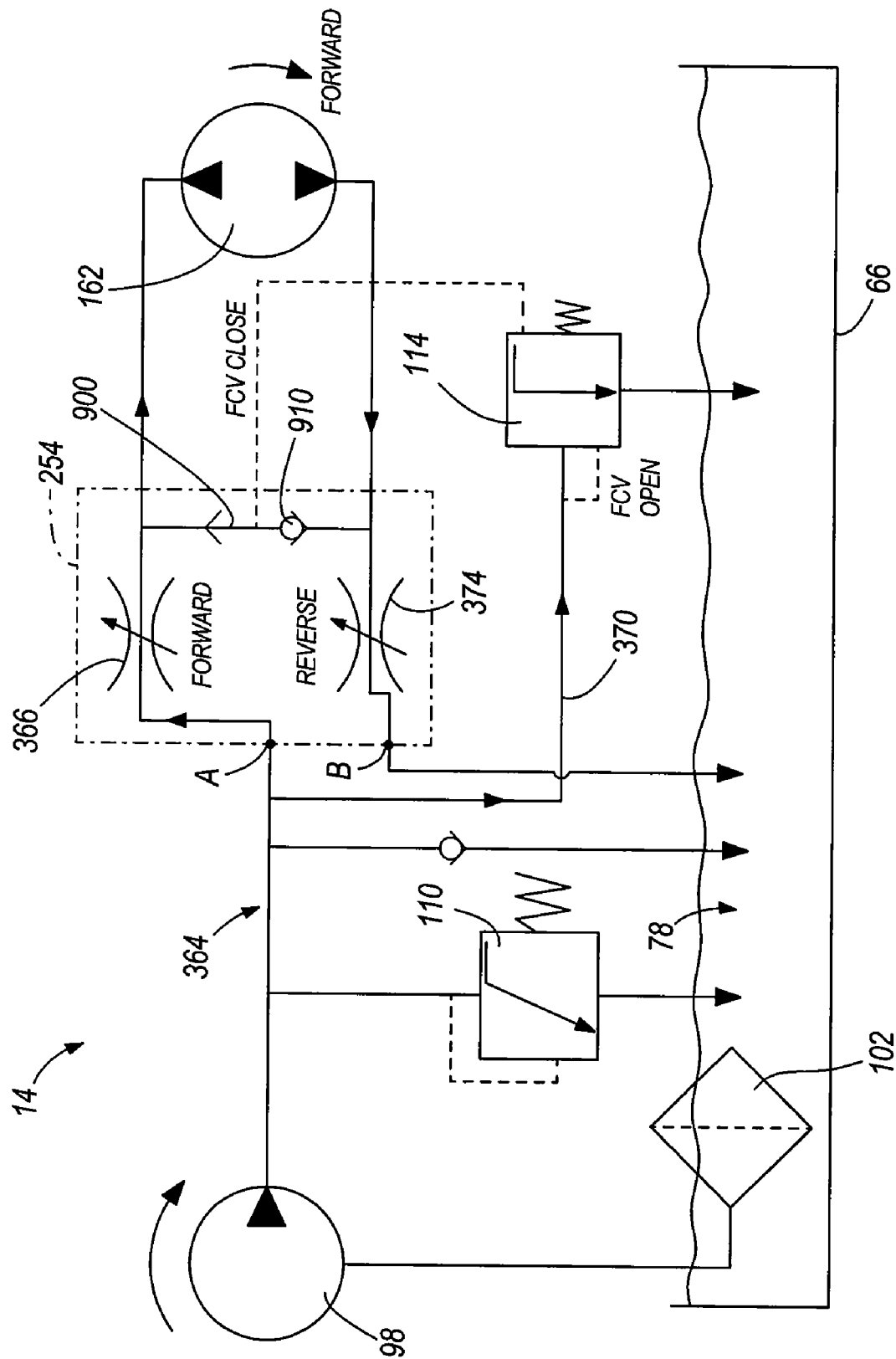
FIG. 12 is a hydraulic circuit diagram of a hydrostatic transmission according to one embodiment of the present invention illustrating fluid flow through the hydrostatic transmission when operating in a forward direction.
Figure 15:
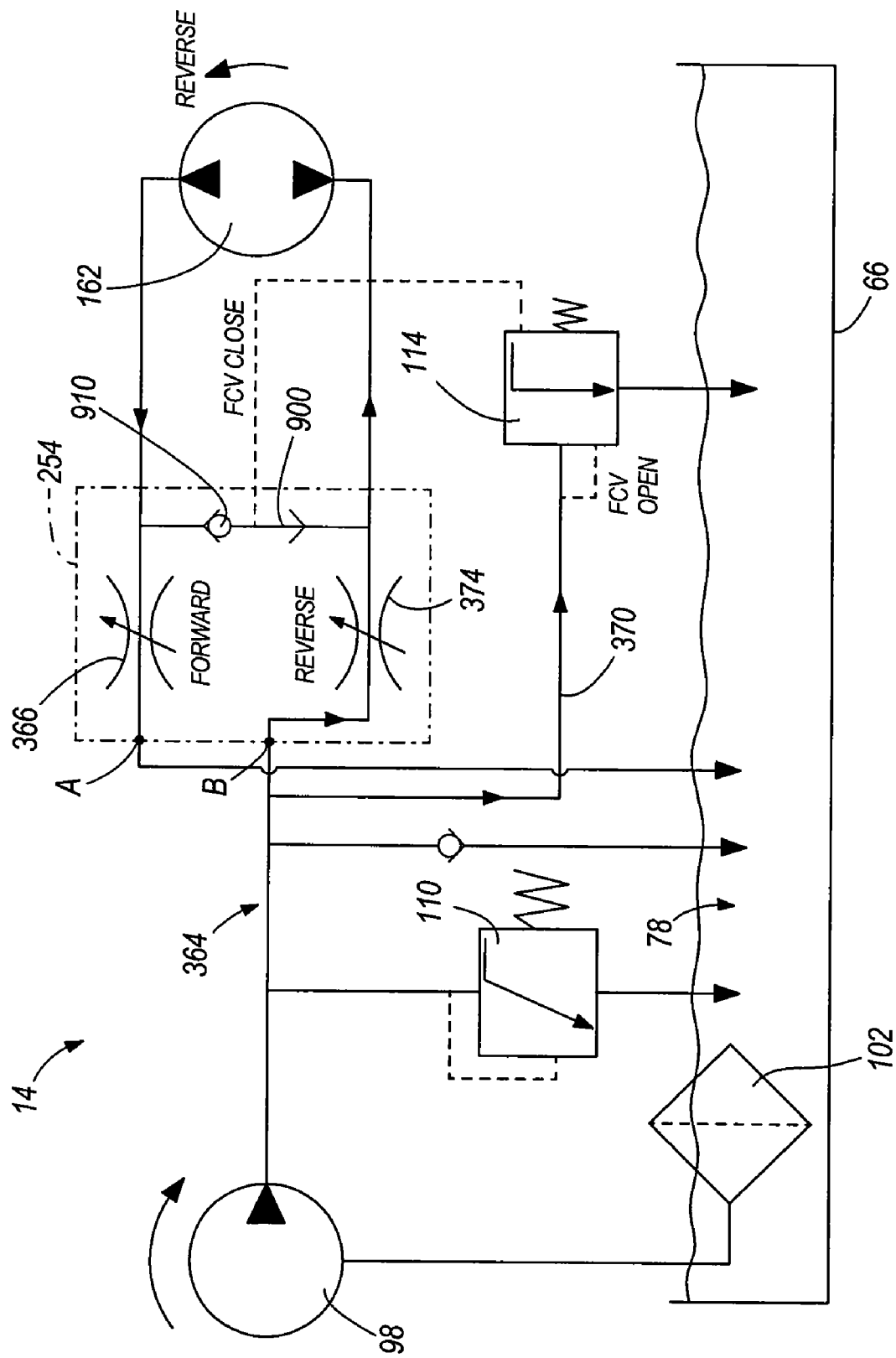
FIG. 15 is a hydraulic circuit diagram of a hydrostatic transmission according to one embodiment of the present invention illustrating fluid flow through the hydrostatic transmission when operating in a reverse direction.

FIGS. 4 and 5 illustrate the hydrostatic transmission module 14 with the first cover 70 removed to reveal the first chamber 78 of the module 14. A seal 96 is positioned between the cover 74 and the housing 66 to create a fluid-tight seal therebetween. In the hydrostatic transmission module 14, components of the hydrostatic transmission are integrated into the common housing 66 and the housing 66 includes an integrally formed fluid flow path (FIGS. 12 and 15). The integrally formed fluid flow path eliminates a complicated hydraulic circuit to coordinate function between components and improves fluid flow between components. Further, the fluid flow path improves durability of the hydrostatic transmission and decreases leakage because no separate, unpackaged components are utilized and the fluid flow path is self-contained within the housing. Positioned within the first chamber 78 of the hydrostatic transmission module 14 are components of the hydrostatic transmission, including the pump shaft 58, a fixed displacement pump 98, a filter 102, a high pressure fluid passage 106 with a pressure relief valve 110 (shown in FIG. 7A), a flow compensating valve 114 (shown in FIG. 7B), and a bevel directional gear 118. In some constructions, and as discussed below, a pump housing portion 122, the high pressure fluid passage 106, a valve housing chamber 198 (shown in FIG. 5) and a valve housing portion 274 are preferably all integrally formed with the housing 66 such that all of these components are a single piece.

Figure 17:
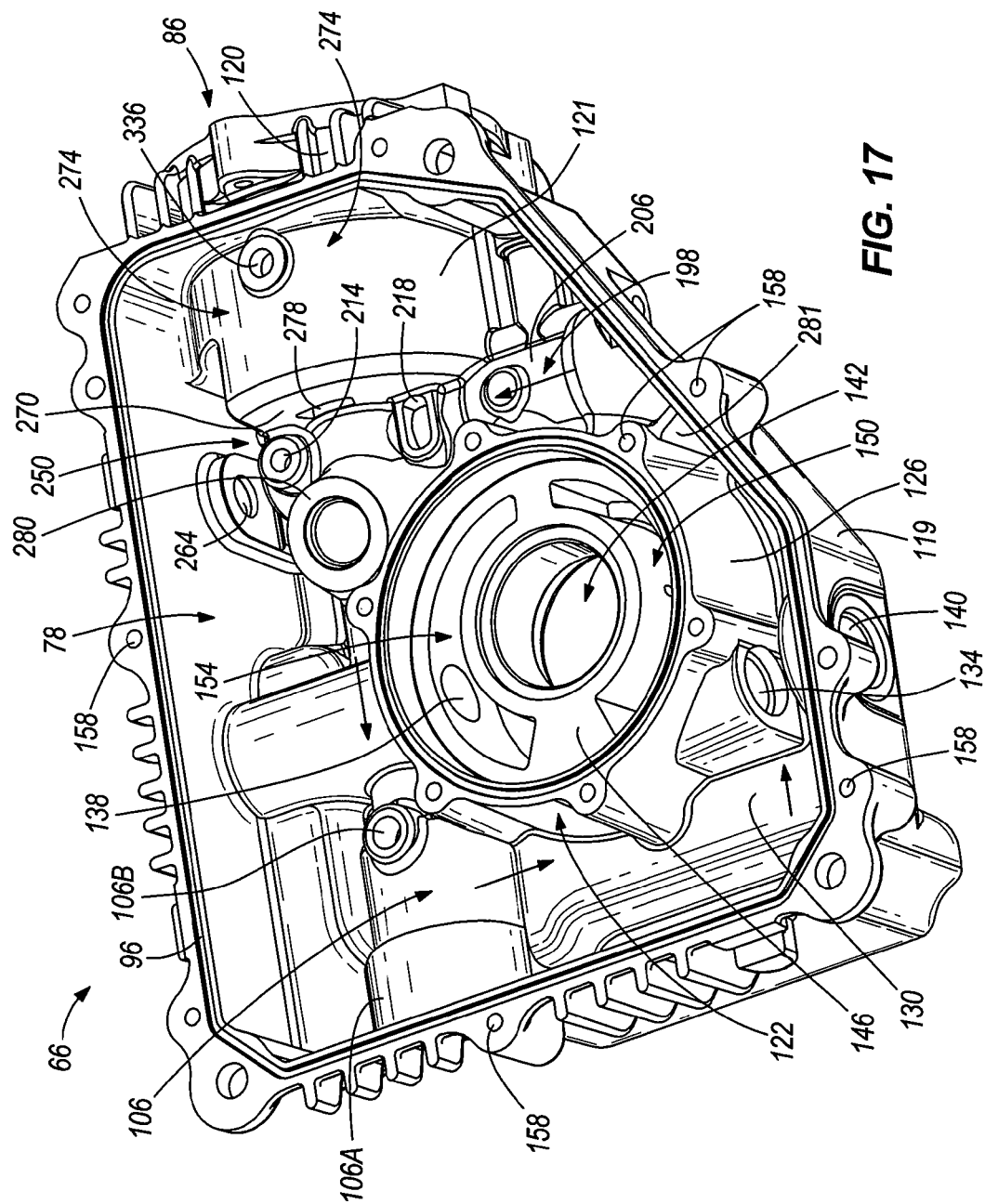
FIG. 17 is a top perspective view of a hydrostatic transmission housing according to one embodiment of the present invention.
Figure 18:
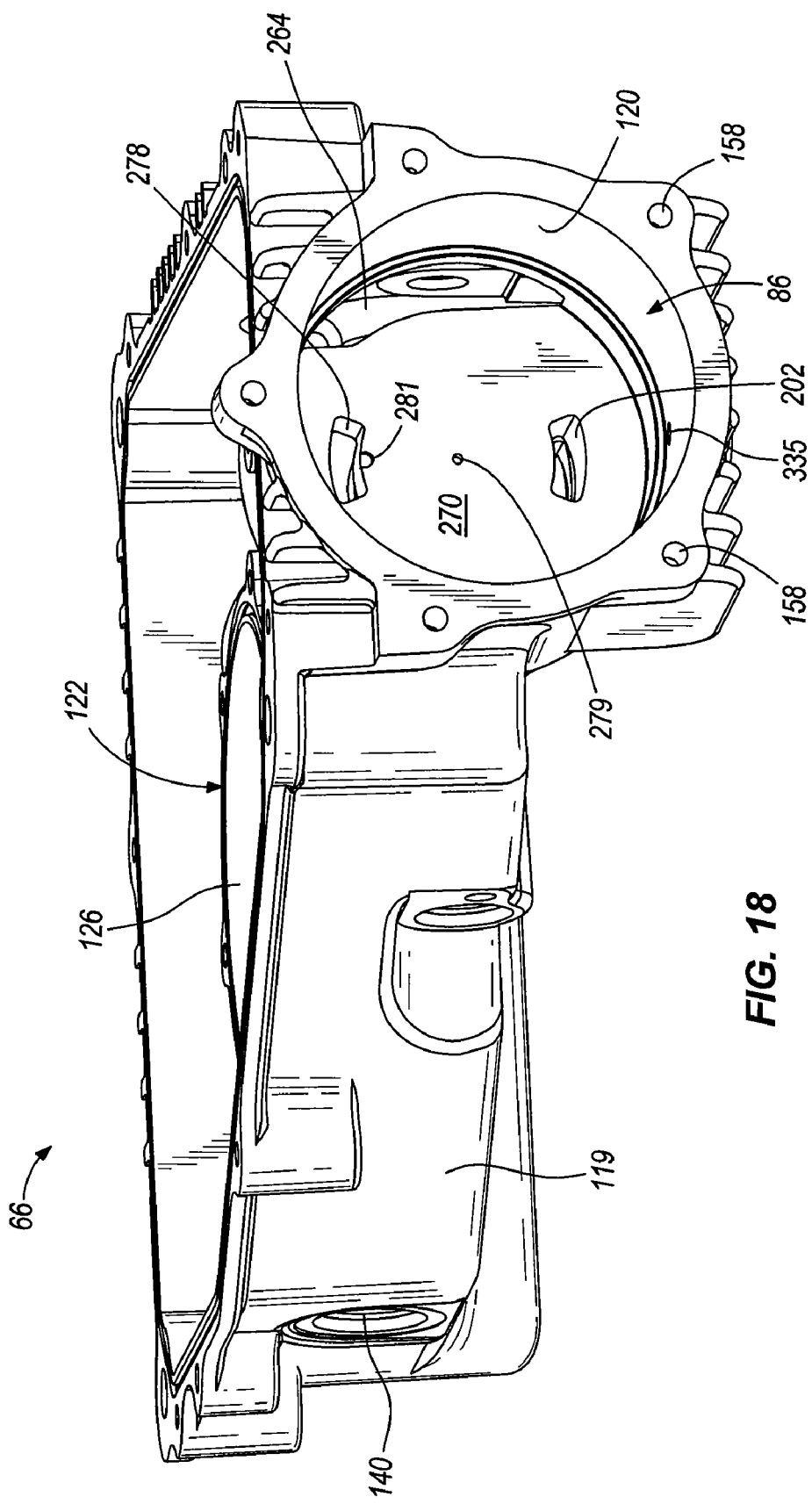
FIG. 18 is a rear perspective view of the hydrostatic transmission housing shown in FIG. 17.

FIGS. 17 and 18 illustrate the housing 66 of the hydrostatic transmission module 14 according to one embodiment of the invention. The housing 66 includes a first outer wall 119 that defines the first chamber 78 of the housing 66, and a generally round second outer wall 120 that partially defines the second chamber 86 and the valve housing portion 274. A rear section of the valve housing portion 274 (FIG. 18) extends into the first chamber 78 of the housing 66, however, a housing wall 270 and a circumferential wall 121 separate the two chambers 78, 86. An exposed edge of the first outer wall 119 includes apertures 158 for receiving fasteners 94 to secure the first cover 70 to the housing 66. An exposed edge of the second outer wall 120 includes apertures 158 for receiving fasteners 94 to secure the second cover 74 to the housing 66.

The common housing of the hydrostatic transmission module integrates all the components of the hydrostatic transmission into one packaged unit, which improves efficiency and cost of manufacturing and assembling the hydrostatic transmission because all the components are located within one housing. In addition, fastening apertures, valve housing portions, chambers, fluid passageways, and fluid ports are formed as part of the housing, thereby eliminating the need of additional pieces and structure. The common housing and integrally formed fluid flow path also eliminate the need for a complicated hydraulic circuit between various components.

Referring to FIGS. 4, 5, 17 and 18, within the first chamber 78, the housing 66 defines a pump housing portion 122 having a generally cylindrical shape for housing the pump 98. The pump housing portion 122 includes a cylindrical outer wall 126 and a lower surface defined by a bottom wall 130 of the housing 66. An oil inlet port 134 (FIG. 17) that fluidly communicates with the first chamber 78 and an oil outlet port 138 (FIG. 17) that fluidly communicates with the high pressure fluid passage 106 are formed in the outer wall 126. The filter 102 is positioned at the oil inlet port 134 to filter oil as it enters the pump 98. The outer wall 119 of the housing 66 may include an opening 140 positioned adjacent the oil inlet port 134 of the pump housing portion 122. The opening 140 may be used for inserting the filter 102 (FIG. 5) into the first chamber 78 for communication with the oil inlet port 134. The opening 140 is used to allow for the passage of a tool during manufacture of the housing 66 and is plugged after fabrication (FIG. 5). The tool is used to complete formation of the oil inlet port 134.

The pump housing portion 122 includes a center hole 142 (FIG. 17) for receiving the pump shaft 58, and chamber walls 146 extending generally upward from the bottom wall 130. The chamber walls 146 define an inlet chamber 150 for receiving oil from the first chamber 78 through the oil inlet port 134, and a discharge chamber 154 for discharging oil through the oil outlet port 138 into the high pressure fluid passage 106. In one construction, the oil outlet port 138 is formed by drilling an opening 156 (FIG. 7A) through the outer wall 119 of the housing 66, which is plugged after fabrication. In the illustrated embodiment, the chamber walls 146 have a height less than a height of the outer wall 126 for accommodating the pump 98. An exposed edge of the outer wall 126 includes apertures 158 (FIG. 17) for receiving fasteners 94 to secure the first cover 70 to the housing 66.

In operation, the hydrostatic transmission module transmits driving power from the engine 34 to the differential 18 to drive the rear wheels 46 at a vehicle speed selected by an operator. The hydrostatic transmission module 14 pumps hydraulic fluid, in particular oil, with the pump 98 from the first chamber 78 of the housing 66 to a fixed displacement motor 162 (see FIG. 8A) housed within the second chamber 86 of the housing 66. The flow compensating valve 114 operates to maintain constant speed of the motor 162, and in particular the drive shaft 22 coupled to the differential 18, by controlling oil flow through the motor 162. Output demands of the motor 162 vary as the vehicle 10 travels over uneven terrain. Based on the output demands, the flow compensating valve 114 operates to control fluid flow to the motor 162 and along a bypass flow path away from the motor 162 to maintain a constant speed of the vehicle, as discussed below. In the illustrated embodiment, the flow compensating valve 114 is positioned in parallel with the rotary control valve 254 (FIGS. 8A, 12 and 15) to reduce the number of orifices in the hydraulic circuit between the pump 98 and the motor 162, which could create a pressure drop and decrease power train efficiency. Further, the flow compensating valve 114 is easily packaged within the common housing 66 upstream of the control valve.

Figure 6:
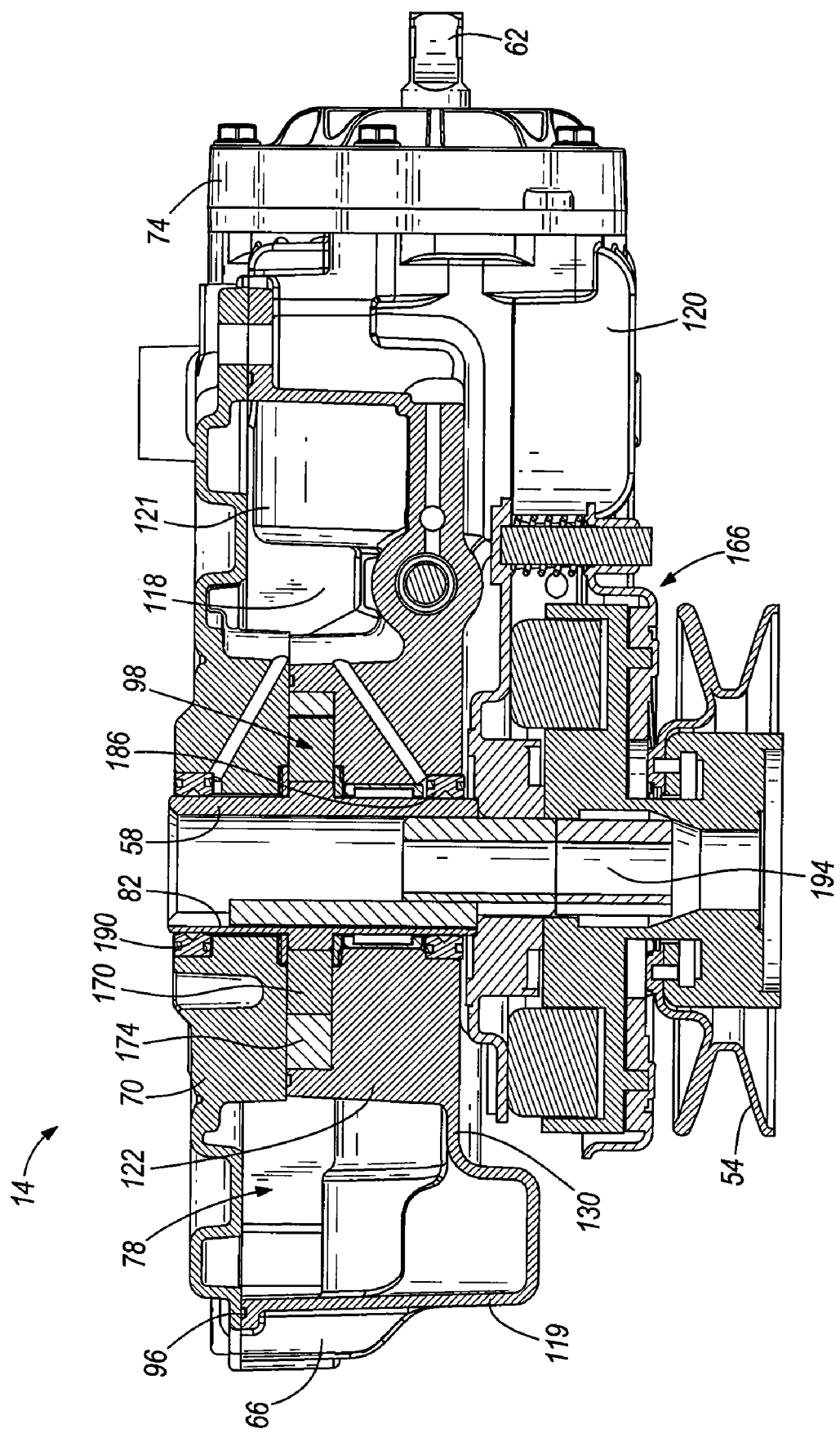
FIG. 6 is a sectional view of the hydrostatic transmission module taken along line 6-6 of FIG. 4, and illustrating a fixed displacement pump.

FIG. 6 is a sectional view of the fixed displacement pump 98 and the output pulley 54, which is coupled to and mounted co-axially with the engine crankshaft, via a clutch assembly 166 for the mower blades. In some constructions, the clutch assembly 166 is eliminated and the output pulley 54 is connected to an extended engine crankshaft that passes through pump shaft 58. Alternatively, the pulley 54 could be mounted directly to a solid pump shaft 58. It should be readily apparent to those of skill in the art that the engine crankshaft may be mounted co-axially to a solid pump shaft 58 and the pump shaft 58 is thereby mounted co-axially to the clutch assembly 166. The pump 98 operates as a sump pump within the hydrostatic transmission module 14 to pump oil from a hydraulic fluid reservoir (i.e., sump) defined by the first chamber 78 to the fixed displacement motor 162.

Referring to FIGS. 4-6, the pump 98 is a positive displacement gerotor pumping unit housed within the pump housing portion 122. The pump 98 includes an inner drive rotor 170 and an outer driven rotor 174, each rotor 170, 174 including a plurality of teeth that mesh and unmesh as the rotors rotate. The outer rotor 174 includes one more tooth than the inner rotor 170. The teeth unmesh on a suction side of the pump 98 to allow atmospheric pressure to force oil into the inlet chamber 150 of the pump housing portion 122 from the sump 78 through the oil inlet port 134. The teeth mesh on a discharge side of the pump 98 to force oil out of the outlet chamber 154 (FIG. 17) of the pump housing portion 122 through the oil outlet port 138 (FIG. 17) to the high pressure fluid passage 106. An outer ring 178 surrounds an outer circumference of the outer rotor 174 to allow the outer rotor 174 to rotate with respect to the pump housing portion 122. The positive displacement gerotor pumping unit 98 provides a pump that is more simple, less bulky, and costs less and is easier to manufacture than other commercially available fixed displacement pumps. The gerotor pump 98 operates as is known in the art, and it should be readily apparent to those of skill in the art that other known pumps and fixed displacement pumps may be used to perform this function, such as external gear, internal gear, vane, axial piston, and radial piston type pumps.

The pump shaft 58 extends through a center opening 182 defined by the inner rotor 170 of the pump 98 and the center hole 142 of the pump housing portion 122. The pump shaft 58 is integrally splined to engage the inner rotor 170 of the pump 98, such that rotation of the pump shaft 58 drives the inner rotor 170 to operate the pump 98. A first seal 186 is positioned between the pump shaft 58 and the lower housing portion 130 to provide a fluid-tight seal, and a second seal 190 is positioned between the pump shaft 58 and the first cover 70 to provide a fluid-tight seal.

The clutch assembly 166, or clutch/brake assembly, as it is sometimes known in the art, includes an inner hub 194 (i.e., an input hub) that is mounted co-axially to the pump shaft 58 by a bolt, or other known fastener. The clutch assembly 166 is positioned on an underside of the hydrostatic transmission module 14 and is used to control the mower blades. The output pulley 54 is coupled to the clutch assembly 166, or clutch/brake assembly, as known in the art, by a bearing and receives a drive belt 56 (FIG. 1).

Figure 7A:
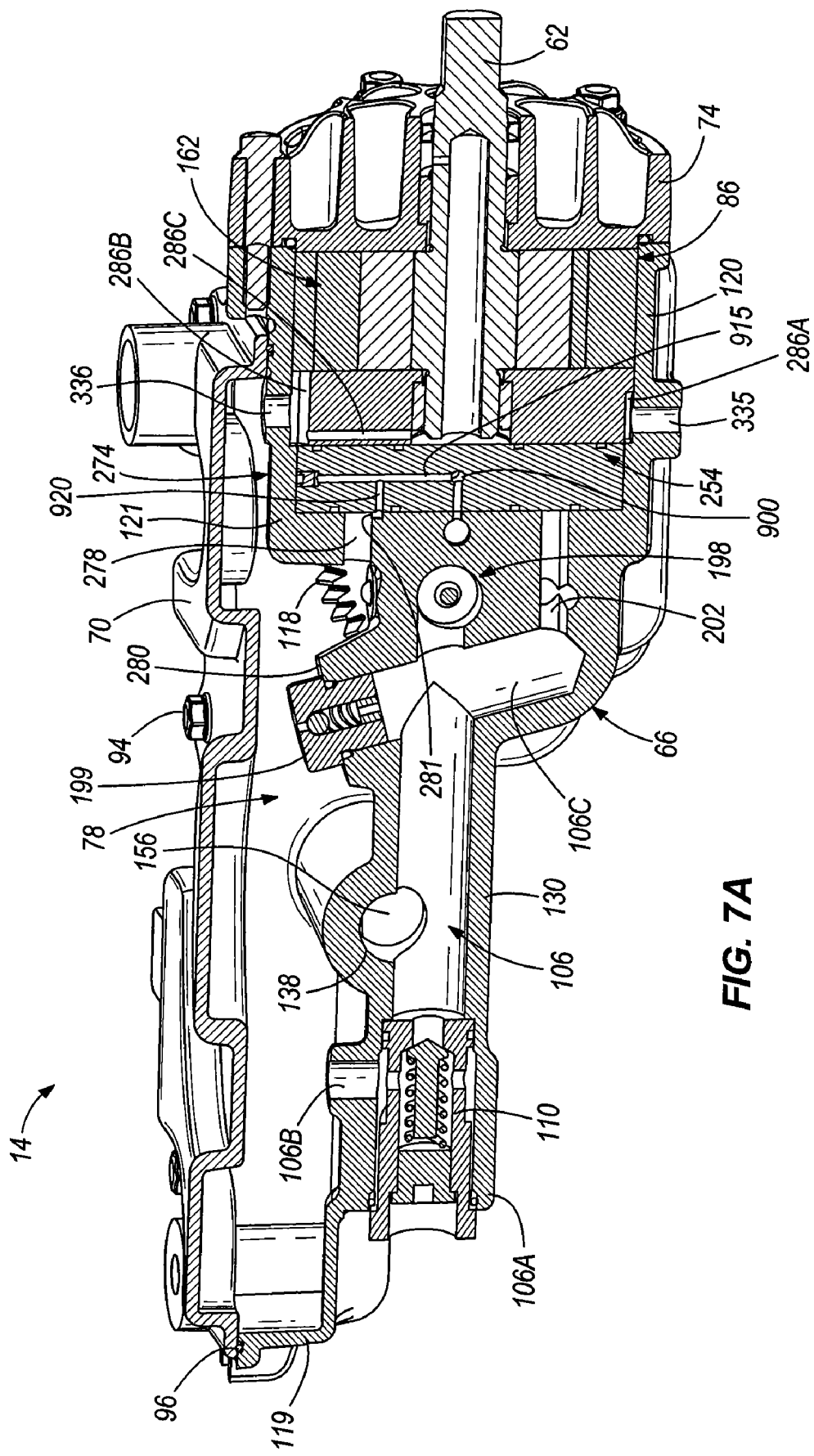
FIG. 7A is a sectional view of the hydrostatic transmission module and motor taken along line 7A-7A of FIG. 5, and illustrating high pressure fluid passage.

Referring to FIGS. 4, 5, 7A, 17 and 18, within the first chamber 78, the housing 66 also defines the high pressure fluid passage 106 integrally formed by the housing 66 and a valve housing chamber 198 for housing the flow compensating valve 114. A first end 106A of the high pressure fluid passage 106 extends through the outer wall 119 of the housing 66. The pressure relief valve 110 is positioned at the first end 106A of the passage 106 for relieving pressure within the high pressure fluid passage 106 should the pressure exceed a predetermined value. The pressure relief valve 110 plugs the first end 106A of the passage 106 and oil is relieved through a relief passage 106B into the first chamber 78. A second end 106C of the high pressure fluid passage 106 fluidly communicates with the motor 162 positioned within the second chamber 86 via an inlet port 202 (FIG. 7B), or valve inlet. The inlet port 202 is defined by the housing 66 and is positioned under the valve housing chamber 198. In the illustrated embodiment, the second end 106C of the high pressure fluid passage 106 is at least partially formed by drilling a hole through the housing. The hole is then plugged with a check valve 199 during fabrication (FIG. 7A). The pressure relief valve 110 is positioned in the high pressure passage 106 between the pump 98 and the motor 162 because such a location facilitates machining operations of the common housing 66 and assembly operations of the hydrostatic transmission module 14, as well as drains directly into the first chamber 78, i.e., the hydraulic fluid reservoir.

The check valve 199 opens in response to a pressure in the first chamber 78 that is in excess of the pressure within the high pressure passage 106. This condition can occur when the motor 162 is rotated without oil flow, such as what occurs when a user pushes a tractor equipped with the transmission. The movement of the motor 162 causes it to pump oil out of the high pressure passage 106, thereby reducing the pressure. The check valve 199 opens during this condition to allow the motor 162 to turn without excessive force and to inhibit the intake of outside air through the motor shaft seals that would undesirably aerate the oil.

Figure 7B:
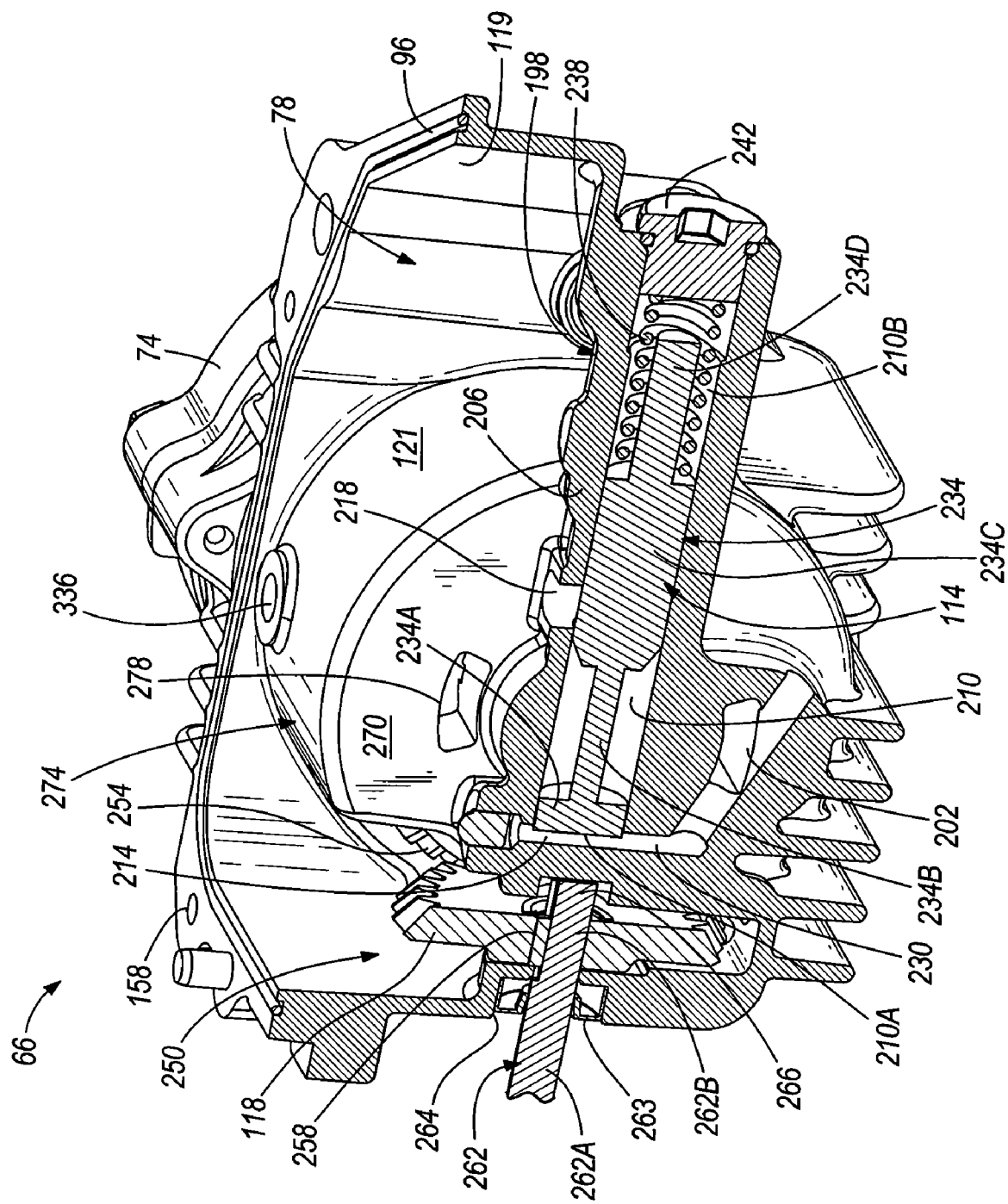
FIG. 7B is a sectional view of the hydrostatic transmission module taken along line 7B-7B of FIG. 5, and illustrating a flow compensating valve.
Figure 8A:
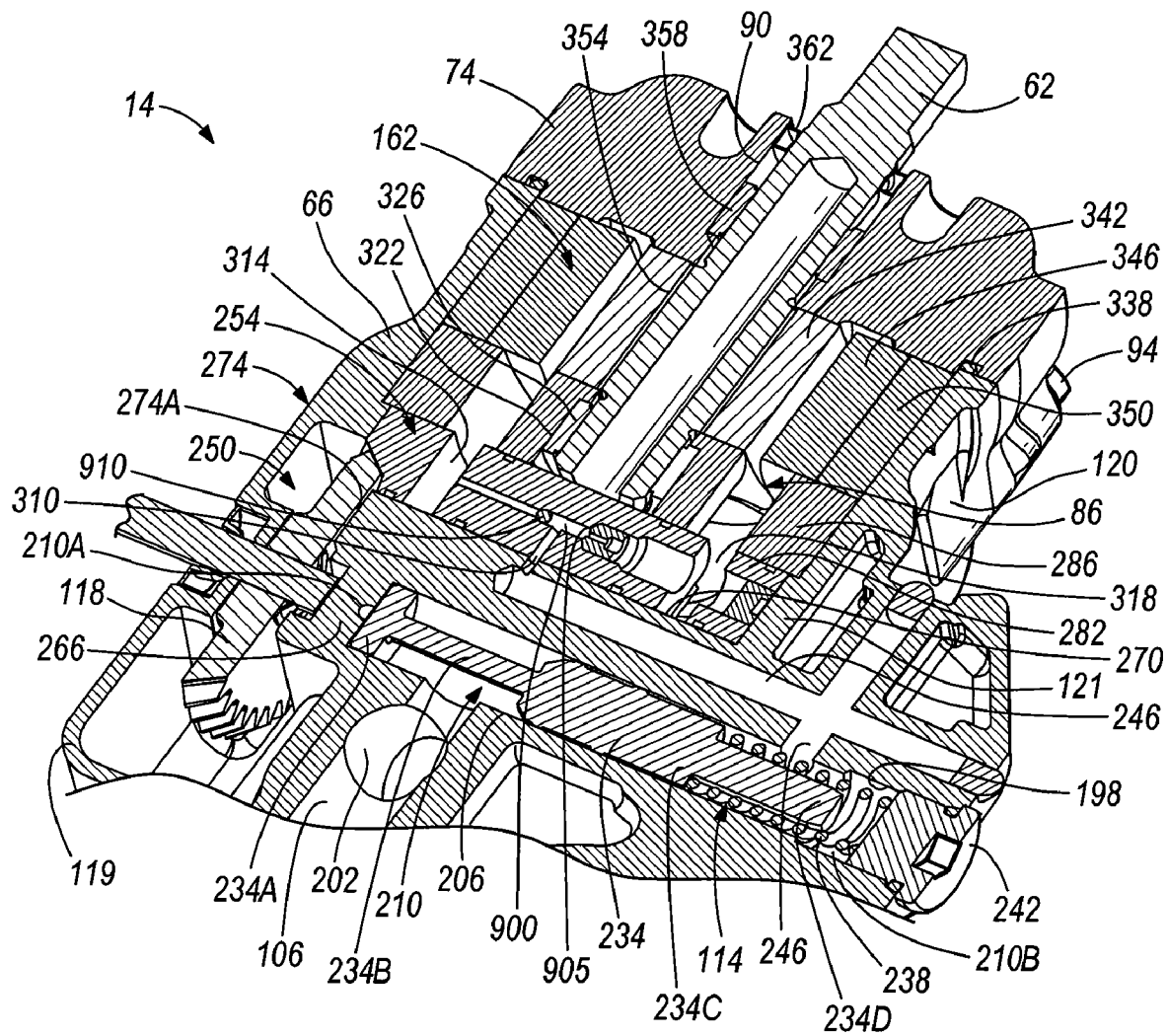
FIG. 8A is a sectional view of the hydrostatic transmission module taken along line 8-8 of FIG. 4, and illustrating a fixed displacement motor.

Referring to FIGS. 5, 7B, and 8A, the valve housing chamber 198 is generally cylindrical and includes an outer wall 206 defining an inner chamber 210 for receiving the flow compensating valve 114. The inner chamber 210 includes a first end 210A proximate the directional gear 118 and a plugged second end 210B. Two ports 214, 218 extend through the outer wall 206 between the first chamber 78 and the inner chamber 210. The first port 214 is positioned at the first end 210A of the inner chamber 210 and provides a passageway 230, which connects the first port 214, the inner chamber 210, and the high pressure fluid passage 106. The first port 214 is plugged after the passageway 230 is drilled (as illustrated in FIG. 7B). The passageway 230 communicates fluid pressure from the high pressure fluid passage 106 to the flow compensating valve 114. The second port 218, which may perform a metering function, provides a portion of a bypass flow path from the high pressure fluid passage 106, through the flow compensating valve 114 to the first chamber 78 of the housing 66.

The flow compensating valve 114 is utilized to maintain a constant speed of the lawn tractor 10, and more particularly the motor 162 and the drive shaft 22. The flow compensating valve 114 maintains a fixed flow, or constant speed, by varying bypass flow around the motor 162. The flow compensating valve 114 is partially controlled by a pressure signal from the high pressure passage 106. During operation, the lawn tractor 10 travels over differing terrains and topography, but the operator desires to maintain constant speed of the lawn tractor 10. Output demands of the motor 162 vary as the lawn tractor 10 travels over the differing terrains and topography, and the flow compensating valve 114 is utilized to control bypass flow such that output demands are met to maintain a constant speed.

With reference to FIGS. 8A and 7B, the flow compensating valve 114 is retained within the valve housing chamber 198 of the hydrostatic transmission module 14 and includes a spool-type valve 234, a biasing spring 238, and a plug 242. The spool 234 is positioned within the inner chamber 210 of the valve housing chamber 198. A first end 234A of the spool 234 has a first diameter substantially equal to a diameter of the inner chamber 210, and defines a piston 234A. A rod portion 234B extends rearward from the piston 234A and has a second diameter less than the first diameter. The spool 234 includes a stop portion 234C positioned between the rod portion 234B and a travel limiter 234D that can be formed as part of the spool 234 or separated from the spool 234 to inhibit excess travel of the spool 234. The plug 242 plugs the second end 210B of the inner chamber 210 and retains the spring 238 in the inner chamber 210. The spring 238 is positioned between the stop portion 234C of the spool 234 and the plug 242 in the second end 210B.

The spring 238 biases the flow compensating valve 114 toward a first position, as shown in FIG. 7B, in which the piston 234A is positioned at the first end 210A of the inner chamber 210 such that port 218 is closed. The spool 234 is exposed to high pressure oil at the extreme end adjacent the piston 234A such that the high-pressure oil works to move the spool 234 against the biasing force of the spring 238. The high-pressure oil flows to the end of the piston from the high pressure fluid passage 106 via passageway 230 and port 214.

With reference to FIG. 8A, high-pressure oil is also directed from the high pressure fluid passage 106 to the space between the piston 234A and the stop portion 234C. Because this high-pressure oil acts on two equally-sized surfaces, it has little effect on movement of the spool 234. The space opposite the piston 210B is in fluid communication with high-pressure oil from a source adjacent the rotary control valve 254. Specifically, oil is directed from the rotary control valve 254 through passageway 246 to the second end 210B. The pressure of this oil can vary with operation, thus controlling movement of the spool 234, as will be discussed.

For example, when this oil is at a pressure similar to the high-pressure oil from the pump, the forces produced by the oil on the spool 234 are substantially balanced such that the spool is biased by the spring 238 into the position illustrated in FIGS. 7B and 8A. However, during certain conditions, the pressure in the second space 210B can drop. For example, when the rotary control valve 254 is positioned in a neutral position, there is little flow to the motor 168 and the fluid communication path to the second space 210B is opened to the first space 78. With this pressure released, the high-pressure on the piston 234A overcomes the biasing force of the spring 238 and moves the spool toward the position illustrated in FIG. 8B. In this position, the space between the piston 234A and the stop portion 234C provides for fluid communication between the high-pressure fluid passage 106 and the bypass port 218. Thus, oil travels directly from the high-pressure fluid passage 106 to the second or bypass port 218 and into the sump 78 without traveling through the rotary control valve 254 or the motor 162.

When output demands of the motor 162 increase, such as when a vehicle employing the transmission climbs a hill, additional oil must be provided to the motor 162 to maintain the desired speed. As the vehicle begins to climb the hill, the motor 162 slows. The slower rotation reduces the amount of oil that can pass through the motor 162 and increases the pressure of the oil in the second space 210B. Thus, the spool 234 is biased toward the position illustrated in FIG. 7B and the flow area between the high-pressure passage 106 and the bypass port 218 is reduced. Thus, more oil is delivered to the motor 162 to speed the rotation and maintain the desired speed up the hill. Eventually, the spool 234 moves to a percent demand position in which there is no bypass flow and the motor 162 uses all of the available oil.

Figure 8B:
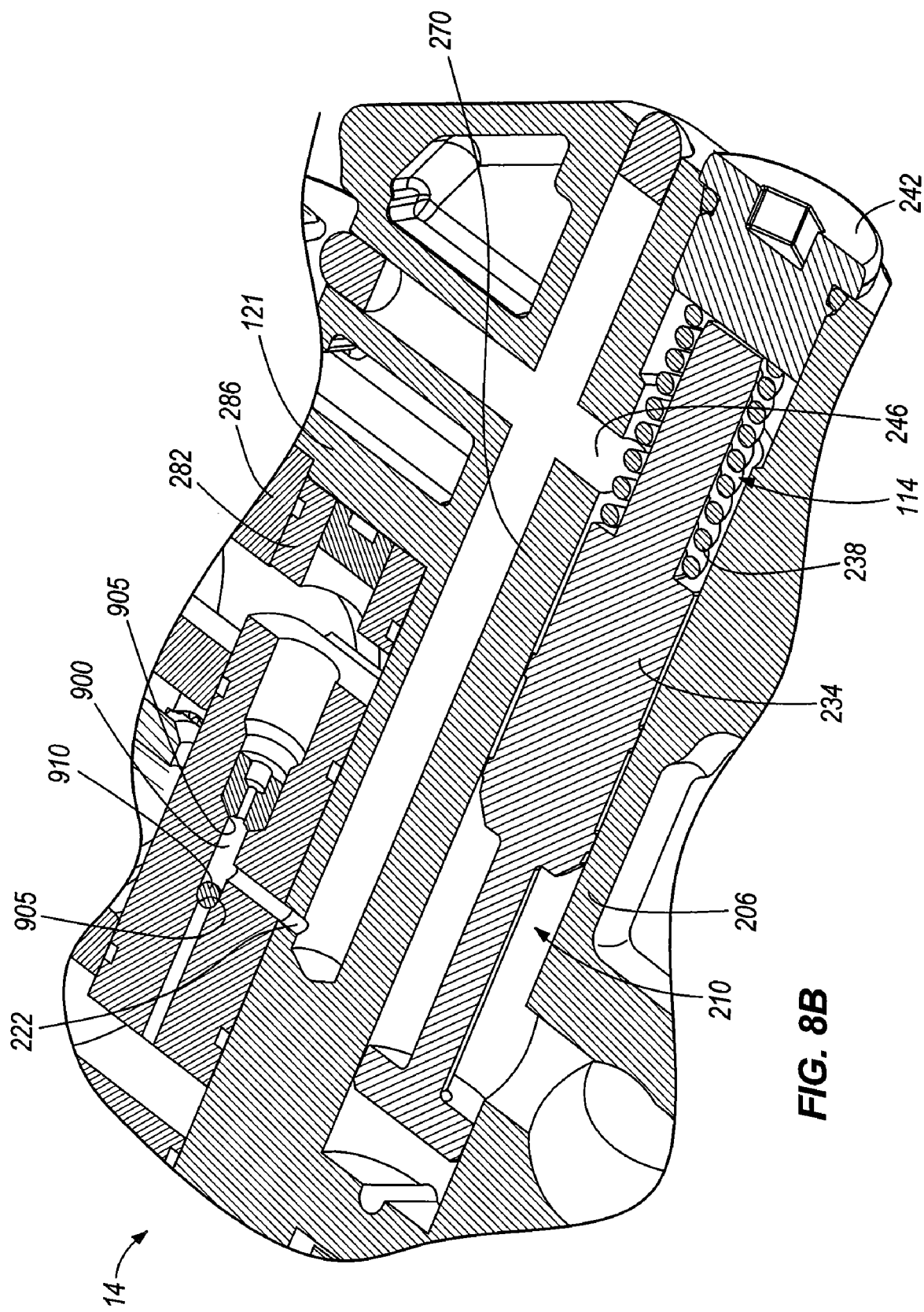
FIG. 8B is an enlarged view of the flow compensating valve shown in FIG. 8A, the flow compensating valve in a normal pressure mode.

FIG. 8B illustrates the flow compensating valve 114 in a normal pressure (PI) position when the lawn tractor 10 is operating on level terrain and some oil is bypassing the motor 162. Normal pressure will vary depending on gross vehicle weight, ground conditions, and other factors. In one example, normal pressure is about 200 psi. When the flow compensating valve 114 is in the normal pressure position, the normal (level terrain) load creates approximately normal pressure PI in the high pressure fluid passage 106 and the flow compensating valve 114 will allow about 50 percent of the oil delivered by the pump 98 to bypass the motor 162.

FIG. 8C illustrates the flow compensating valve 114 in a high pressure (P2) position when the lawn tractor 10 is operating on an uphill grade. When the flow compensating valve 114 is in the high pressure position, the high (uphill terrain) load creates high pressure P2 in the second end 210B and the flow compensating valve 114 moves to reduce bypass flow from the fluid passage 106 to the housing chamber 78. A constant speed of the lawn tractor 10 and the motor 162 will be maintained by increasing flow to the motor, and thereby decreasing bypass fluid flow.

As discussed, FIG. 8B illustrates a normal pressure position and FIG. 8C illustrates a high pressure position. As one of ordinary skill in the art will realize, the valve can move to a low pressure position in which additional flow bypasses the motor 162. For example, the flow compensating valve 114 will move to a low pressure (P3) position when the lawn tractor 10 is operating on a downhill grade. When the flow compensating valve 114 is in the low pressure position, the low (downhill terrain) load creates low pressure P3 in the second space 2101B and the flow compensating valve 114 moves to allow additional bypass flow up to about 100 percent (i.e., neutral) of the flow provided by the pump 98. A constant speed of the lawn tractor 10 and the motor 162 will be maintained by increasing motor bypass flow, and thereby decreasing fluid flow to the motor 162. It should be readily apparent to those of skill in the art that the flow compensating valve 114 can block any percentage of the bypass flow depending on system demands.

Referring to FIGS. 5, 7B, and 8A, the housing 66 defines a slot 250 for receiving the bevel directional gear 118, an outer circumference of which is intermeshed with the rotary control valve 254 positioned in the second chamber 86. The directional gear 118 includes a central bore 258 for receiving a control shaft 262. The shaft 262 is utilized to select speed and forward or reverse operation of the motor 162 via the rotary control valve 254, and thereby of the lawn tractor 10. A portion 262A of the shaft 262 positioned outside the hydrostatic transmission module 14 is interconnected with an operator linkage to select an operating direction of the lawn tractor 10, such as the directional lever 28 (FIG. 1). The shaft 262 extends through an opening 264 in the outer wall 119 of the housing 66 (and is supported by a journal in the housing 66), through the central bore 258 of the directional gear 118, and another portion 262B of the shaft 262 is rotatably anchored within a journal 266 in the housing 66. A seal 263 provides a fluid-tight seal between the shaft 262 and the housing 66.

Rotation of the control shaft 262 by an operator (via an operator interface and control linkage) in a first direction causes rotation of the directional gear 118 in a first direction, which causes forward operation of the rotary control valve 254, as discussed below. Rotation of the control shaft 262 by an operator (via an operator interface and control linkage) in a second direction causes rotation of the directional gear 118 in a second direction, which causes reverse operation of the rotary control valve 254, as discussed below. Specifically, rotation of the control shaft 262 produces a corresponding oscillation, rotation, revolution, etc. of the rotary control valve 254 through an angle less than about 180 degrees. In preferred constructions, the rotary control valve 254 rotates through an angle between about 40 and 80 degrees. In other preferred constructions, the rotary control valve 254 rotates through an angle between about 20 and 40 degrees. The operator interface and linkage controls direction and speed of the motor by rotating the control valve 254 in either a first direction or a second direction. Examples of an operator interface and control linkage that could be used to control the directional gear 118 are a push/pull cable with fender-mounted shifter (FIG. 24), a mechanical linkage with fender-mounted shifter (FIG. 25), and a mechanical linkage with right-side foot pedal (FIG. 26). As discussed below, each of these embodiments includes a linkage that couples to the control shaft 262 to reciprocate the control valve 254 in either direction.

Figure 24:
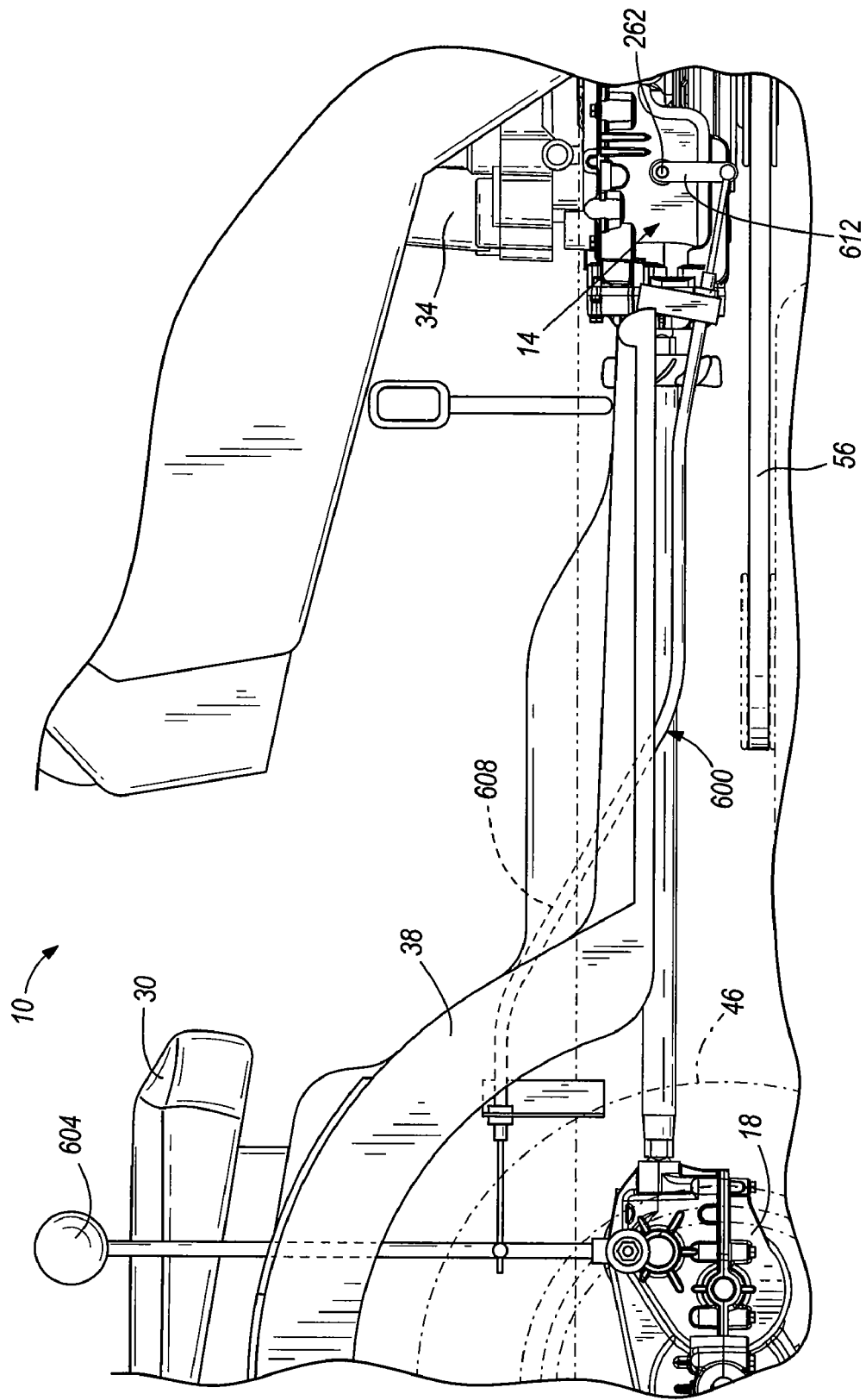
FIG. 24 illustrates an operator interface and linkage for controlling the rotary control valve, according to one embodiment of the invention.

FIG. 24 illustrates one embodiment of an operator interface and linkage 600 for controlling the rotary control valve 254 including a fender-mounted shifter 604, a push/pull cable 608 having one end coupled to the shifter 604, and a linkage 612 connecting an opposite end of the cable 608 and the control shaft 262. An operator controls direction of travel by pushing the shifter 604 forward or pulling the shifter backwards. In the illustrated embodiment, the shifter 604 starts in a neutral position. By pushing the shifter 604 forward, the cable 608 pushes the linkage 612 to rotate the control shaft 262, and thereby the directional gear 118, in a first direction. By pulling the shifter 604 backwards, the cable 608 pulls the linkage 612 to rotate the control shaft 262, and thereby the directional gear 118, in a second direction.

Figure 25:
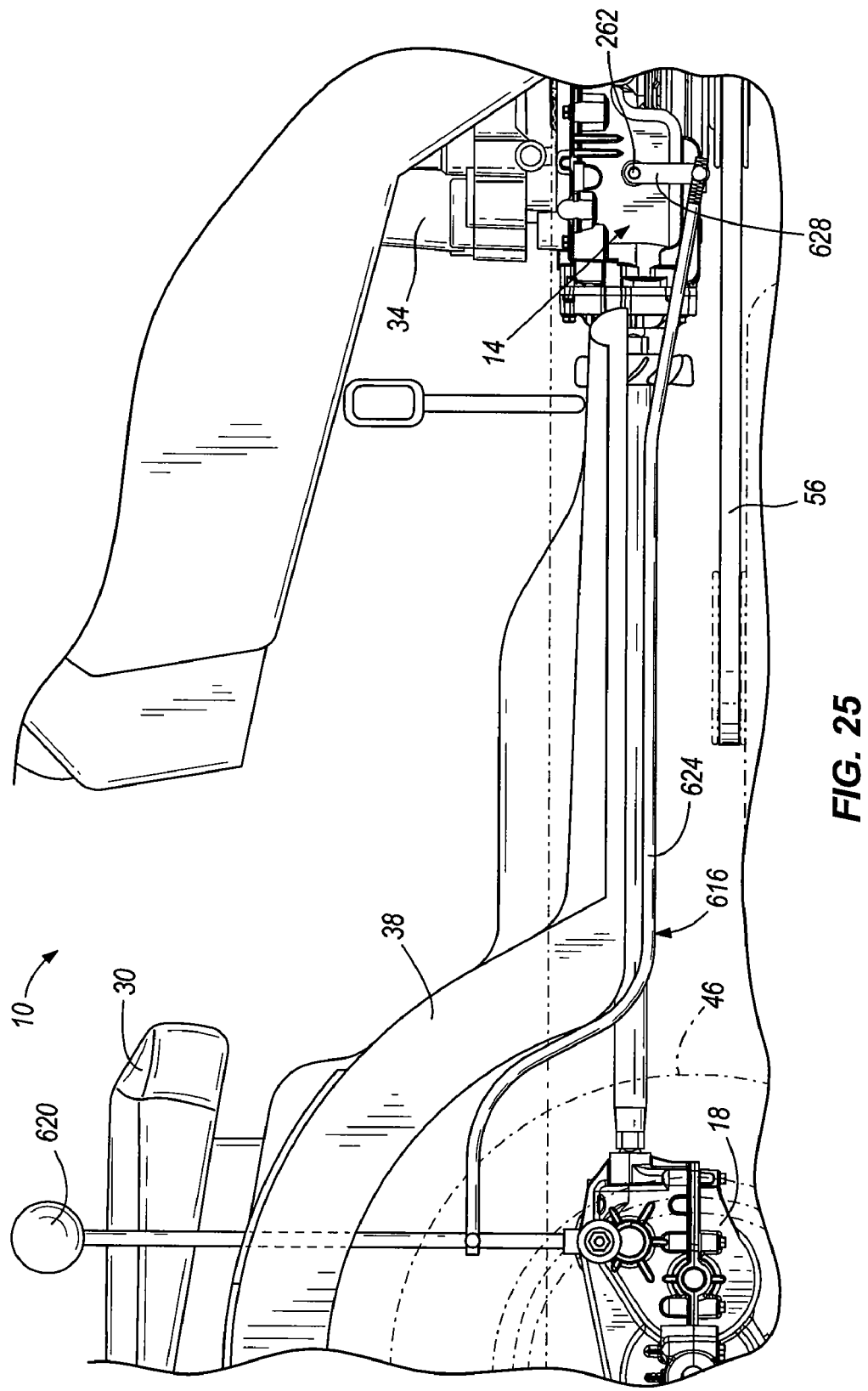
FIG. 25 illustrates an operator interface and linkage for controlling the rotary control valve, according to one embodiment of the invention.
Figure 26:
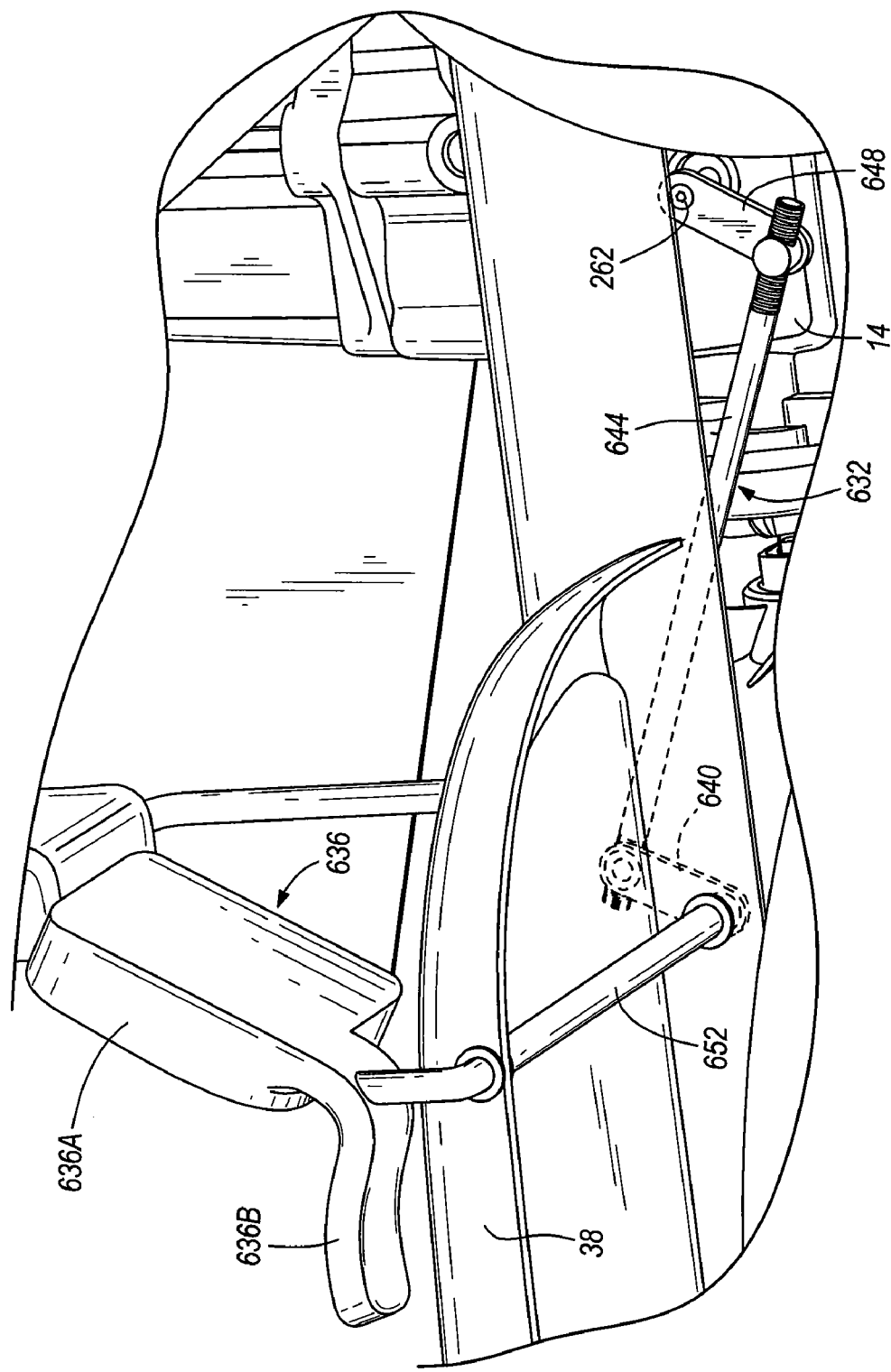
FIG. 26 illustrates an operator interface and linkage for controlling the rotary control valve, according to one embodiment of the invention.

FIG. 25 illustrates another embodiment of an operator interface and linkage 616 for controlling the rotary control valve 254 including a fender-mounted shifter 620, a first linkage 624 having one end coupled to the shifter 620, and a second linkage 628 connecting an opposite end of the first linkage 624 and the control shaft 262. An operator controls direction of travel by pushing the shifter 620 forward or pulling the shifter backwards. In the illustrated embodiment, the shifter 620 starts in a neutral position. By pushing the shifter 620 forward, the first linkage 624 pushes the second linkage 628 to rotate the control shaft 262, and thereby the directional gear 118, in a first direction. By pulling the shifter 620 backwards, the first linkage 624 pulls the second linkage 628 to rotate the control shaft 262, and thereby the directional gear 118, in a second direction.

FIG. 26 illustrates another embodiment of an operator interface and linkage 632 for controlling the rotary control valve 254. The operator interface and linkage 632 includes a two-directional foot pedal 636 mounted to the vehicle frame 38, a first linkage 640 connected to the foot pedal 636, a second linkage 644 connected to the first linkage 640, and a third linkage 648 connected between the second linkage 644 and the control shaft 262. In the illustrated embodiment, the foot pedal 636 is generally L-shaped and includes a first lever member 636A for effecting travel of the vehicle in a first direction, a second lever member 636B for effecting travel of the vehicle in a second direction, and an arm 652 for coupling the pedal 636 to the first linkage 640. FIG. 26 shows the pedal in a neutral position. Pressing down on the first lever member 636A of the pedal 636 causes the pedal 636 and arm 652 to rotate in a first direction, which causes the interconnected linkages 640, 644, 648 to rotate the control shaft 262, and thereby the directional gear 118, in a first direction. Pressing down on the second lever member 636B of the pedal 636 causes the pedal 636 and arm 652 to rotate in a second direction, which causes the interconnected linkages 640, 644, 648 to rotate the control shaft 262, and thereby the directional gear 118, in a second direction. In a further embodiment, two pedals may be used to select the travel direction of the vehicle, or the pedal linkages may include a spring member to return the pedal to a neutral position when an operator's foot has been removed from the pedal.

It should be readily apparent to those of skill in the art that in further embodiments of the operator interfaces and linkages, operation of the interface in a first direction may initiate operation of the vehicle in a reverse direction and operation of the interface in a second direction may initiate operation of the vehicle in a forward direction.

Figure 9:
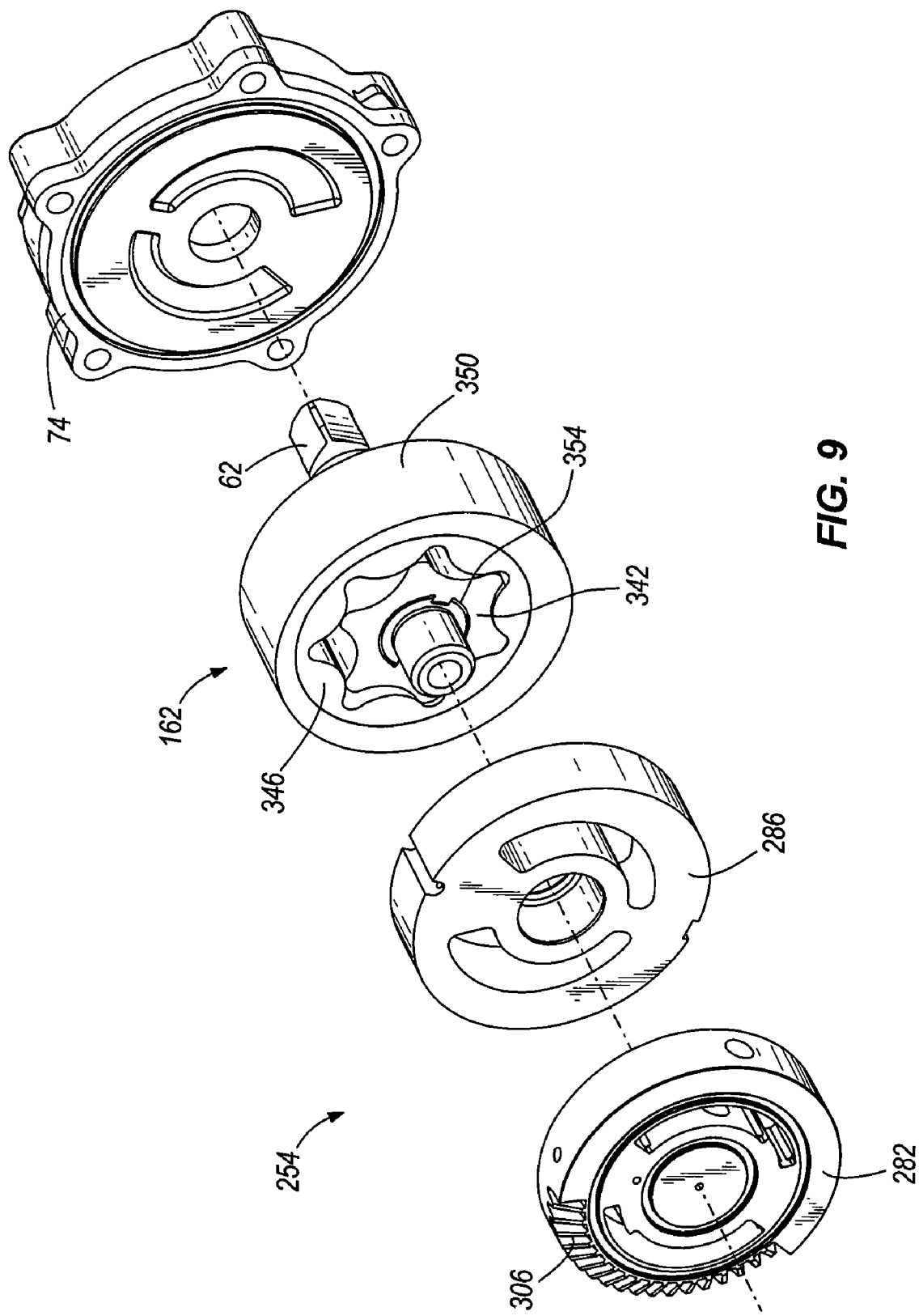
FIG. 9 is an exploded view of the fixed displacement motor and rotary control valve shown in FIG. 8A.

FIG. 8A illustrates the rotary control valve 254 and the motor 162 housed in the second chamber 86 of the hydrostatic transmission module 14, and FIG. 9 illustrates an exploded view of the rotary control valve 254 and the motor 162. The rotary control valve 254 provides both directional control (forward-neutral-reverse) and flow control (metered outlet ports) in the hydraulic circuit. The rotary control valve 254 is easy to manufacture, integrate with the motor 162, and integrate with the housing 66. Further, the rotary control valve 254 has a flexible porting design such that the ports may be custom shaped and tuned through the valve 114 to achieve desired flow characteristics, shift quality and drivability. In another embodiment, an integrated linear spool valve may be utilized with the hydraulic transmission module 14 to control direction and fluid flow with respect to the motor 162.

As seen in FIGS. 7A and 7B, the second chamber 86 of the housing 66 is separated from the first chamber 78 by the housing wall 270, and the housing 66 includes the valve housing portion 274 for housing a portion of the rotary control valve 254. The housing wall 270 of the valve housing portion 274 separates the first chamber 78 and the second chamber 86, and is partially defined by the valve housing chamber 198 for the flow compensating valve 114.

Referring to FIG. 18, the housing wall 270 includes a close signal orifice 279, the valve inlet 202 between the high pressure fluid passage 106 and the second chamber 86, and a valve outlet 278 having a notch 281 between the second chamber 86 and the first chamber 78. Further, as illustrated in FIG. 8A, the valve housing portion 274 includes an opening 274A adjacent the slot 250 for allowing the directional gear 118 to intermesh with the rotary control valve 254.

As oil is discharged from the rotary control valve 254 through the valve outlet 278, the oil is deflected downward toward the bottom wall 130 of the first chamber 78 and away from the pump 98. Referring to FIGS. 5 and 7A, the oil is deflected downward by a portion 280 of the housing 66 defining the high pressure fluid passage 106. The portion 280, or baffle, of the housing 66 is spaced apart from and aligned with the valve outlet 278 formed in the wall 270 of the valve housing portion 274. A partition wall 281 extends between the outer wall 119 of the housing 66 and the outer wall 126 of the pump housing portion 122. The partition wall 281 defines a flow path (shown by arrows in FIG. 17) for oil to flow in the sump 78, and in particular to prevent oil recently discharged from the rotary control valve 254 from flowing directly back to the oil inlet port 134 and the pump 98 and to allow the oil to de-aerate.

Figure 10:
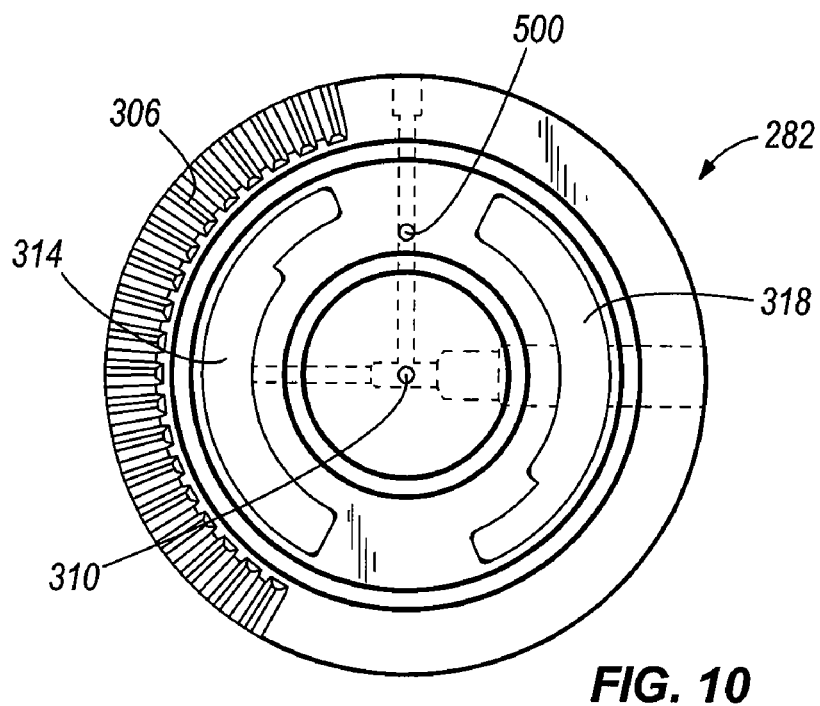
FIG. 10 is a front view of a rotary plate of the rotary control valve.
Figure 11:
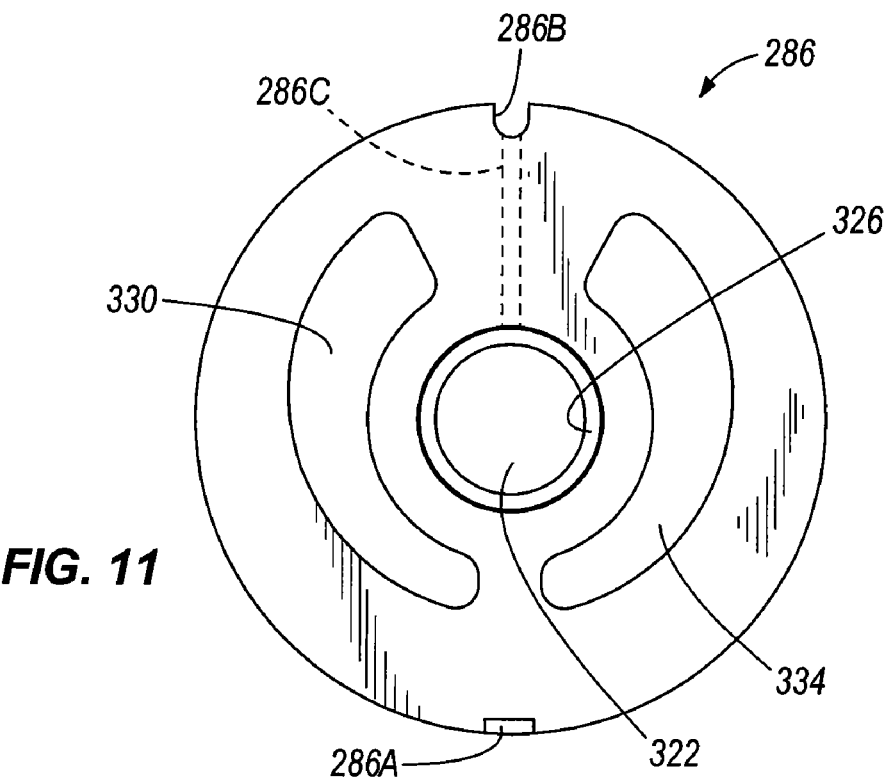
FIG. 11 is a front view of a stationary plate of the rotary control valve.

As illustrated in FIGS. 8A and 9, the rotary control valve 254 includes a rotary plate 282 (FIG. 10) and a stationary plate 286 (FIG. 11). The rotary plate 282 is positioned between the housing wall 270 and the stationary plate 286, and within the valve housing portion 274. An outer circumference of the rotary plate 282 includes gear teeth 306 for intermeshing with the bevel directional gear 118 through the opening 274A adjacent the slot 250. Rotation of the directional gear 118 in the first direction causes the rotary plate 282 to rotate in a first direction (counter-clockwise in the illustrated embodiment) to thereby facilitate forward operation of the motor 162, as discussed below. Likewise, rotation of the directional gear 118 in the second direction causes the rotary plate 282 to rotate in a second direction (clockwise in the illustrated embodiment) to thereby facilitate reverse operation of the motor 162, as discussed below. In the illustrated embodiment, the rotary plate 282 has a diameter smaller than a diameter of the stationary plate 286. In one embodiment, the rotary plate 282 is formed from a single sintered metal piece or metal casting, and the gear teeth 306 may be formed separately from a plastic material. In still other constructions, the rotary plate 282 and gear teeth 306 are integrally formed as a single piece. The directional gear 118 may be formed of a single piece sintered metal, metal casting, or molded plastic construction.

With reference to FIG. 10, the rotary plate 282 includes a center opening 310 aligned with a central axis of the plate 282. The center opening 310 faces the housing wall 270, but does not pass completely through the rotary plate 282. The rotary plate 282 also includes two directional openings, a forward opening 314 and a reverse opening 318, centered about the radial axis and that pass through the rotary plate 282. The openings 314, 318 allow oil to flow through the rotary plate 282, to the motor 162 and back through the rotary plate 282, and thereby facilitate forward or reverse operation of the motor 162 depending on which opening 314, 318 is utilized as an inlet opening for oil flow to the motor 162. The openings 314, 318 are generally arc-shaped and have substantially identical shapes. The openings 314, 318 are positioned between the gear teeth 306 and the center opening 310 of the plate 282. Each opening 314, 318 also varies in width along a length of the opening. The varying width allows for variation of oil flow to the motor 162 and, thereby allows for finer control of motor speed.

As illustrated in FIG. 8A, the center opening 310 is in fluid communication with the passageway 246 that provides fluid communication to the second space 210B. The center opening 310 connects to a transverse passage 900 that connects to both the forward opening 314 and the reverse opening 318. Two check valve seats 905 (shown in FIG. 8B) are formed or positioned within the transverse passage 900 with a single ball 910 positioned between the seats 905. Thus, the highest pressure fluid from either opening 314, 318 will move the ball 910 toward the opposite seat 905 such that the highest pressure is delivered to the second space 2101B, via passage 222 and 246, but no fluid is transferred directly between the openings 314, 318. In this way, the correct pressure signal is delivered to the second space 210B no matter the direction of rotation of the motor 162.

A second passage 915, illustrated in FIG. 7A, formed within the rotary plate 282 connects the transverse passage 900, the passageway 246, and the second space 2101B to a vent opening 920. As illustrated in FIG. 7A, when in the neutral position, the vent opening 920 aligns with the notch 281 to open the second space 210B to the housing chamber 78. This assures that when in the neutral position, no pressure will be trapped in the transverse passage 900, the passageway 246 or the second space 210B. This vent opening 920 only aligns with the notch 281 when the rotary plate 282 is positioned in the neutral position. In all other operating positions, the vent opening 920 is closed.

The stationary plate 286, illustrated in FIG. 11, is positioned between the rotary plate 282 and the motor 162, and within the second chamber 86. In the illustrated embodiment, the stationary plate 286 has a diameter greater than the diameter of the rotary plate 282. The stationary plate 286 includes a bore 322 centered about the central axis of the plate 286 for receiving and supporting the motor shaft 62. The stationary plate 286 is mounted to the motor shaft 62 at the bore 322 by a first bearing 326 to allow the motor shaft 62 to rotate relative to the stationary plate 286. The stationary plate 286 includes two openings, a first opening 330 and a second opening 334, for allowing oil to flow through the stationary plate 286, to the motor 162 and back through the stationary plate 286. The openings 330, 334 are generally arc-shaped and are mirror images of each other. In the illustrated embodiment, the openings 330, 334 of the stationary plate 286 are larger than the directional openings 314, 318 of the rotary plate 282. The openings 330, 334 are positioned between an outer circumference and the bore 322 of the plate 286. In one embodiment, the stationary plate 286 is formed from sintered metal. It should be noted that other constructions may vary the size and/or the shape of the forward and reverse openings 314, 318 of the rotary plate 282 and/or the openings 330, 334 of the stationary plate 286 to allow for variations in speed between forward and reverse. As such, the invention should not be limited to constructions that include identical forward and reverse openings 314, 318 and 330, 334.

A lower edge of the stationary plate 286 includes a notch 286A. When the rotary control valve 254 is assembled in the second chamber 86, the notch 286A is aligned with an opening 335 (shown in FIG. 7A) in the outer wall 120 of the housing 66. A pin (not shown) extends through the opening 335 and engages the stationary plate 286 at the notch 286A to prevent rotation of the stationary plate 286 in the second chamber 86. An upper edge of the stationary plate 286 includes a notch 286B, and a vent channel 286C extends between the bore 322 and the notch 286B. When the rotary control valve 254 is assembled in the second chamber 86, the notch 286B is aligned with an opening 336 (shown in FIG. 7A) in the outer wall 120 of the housing 66. The vent 286C and the notch 286B vent pressure buildup behind the motor shaft seals to the reservoir 78.

As discussed above, the shape and size of the ports or openings are selected to achieve desired flow characteristics, shift quality and drivability of the hydrostatic transmission module 14, and can be varied as required by the particular application.

Referring to FIG. 8A, the motor 162 is a positive displacement gerotor motor housed within the second chamber 86 of the hydrostatic transmission module 14 and the second cover 74 is attached to the housing 66 to enclose the chamber 86. The positive displacement gerotor motor 162 provides a motor that is simpler, less bulky, and costs less and is easier to manufacture than other commercially available fixed displacement motors. A seal 338 is positioned between the cover 74 and the housing 66 to create a fluid-tight seal. The motor 162 is positioned between the rotary control valve 254 and the cover 74. The gerotor motor 162 includes an inner drive rotor 342, an outer driven rotor 346, and an eccentric, outer ring 350. The rotors 342, 346 include a plurality of teeth that mesh and unmesh as the rotors 342, 346 rotate, and the outer rotor 346 includes one more tooth than the inner rotor 342. As discussed above with respect to the gerotor pump 98, the teeth unmesh on an inlet, or high pressure, side of the motor 162 to allow oil into the motor 162 from the rotary control valve 254. The teeth mesh on a discharge side of the motor 162 to allow oil out of the motor 162 and back through the rotary control valve 254.

The outer ring 350 surrounds an outer circumference of the outer rotor 346 and allows the outer rotor 346 to rotate with respect to the housing 66. In the illustrated embodiment, an inner bore of the outer ring 350 is coated with an anti-friction material to reduce motor friction. In a further embodiment, the outer ring 350 may be eliminated such that the outer rotor 346 rotates within a bore, or journal, of the housing 66, which may be coated or uncoated with an anti-friction material. If uncoated, an oil film may provide a hydrodynamic bearing between the outer rotor 346 and the bore surface.

The motor shaft 62 extends through a central bore 354 defined by the inner rotor 342, through the cover 74 and out of the hydrostatic transmission module 14. The cover 74 is mounted to the motor shaft 62 by a second bearing 358 to allow the motor shaft 62 to rotate relative to the cover 74. A seal 362 is positioned between the motor shaft 62 and the second cover 74 to provide a fluid-tight seal.

The motor shaft 62 is integrally splined to engage the inner rotor 342 of the motor 162, such that rotation of the motor 162 also drives the motor shaft 62. As discussed below, the rotary control valve 254 controls whether the motor 162 operates in a forward direction or a reverse direction. When the rotary control valve 162 is actuated in the first direction, oil is pumped through the rotary control valve 254 and the motor 162 in a first direction. Thereby, the motor 162 and the motor shaft 62 rotate in a first direction, which operates the lawn tractor 10 in a forward direction. When the rotary control valve 254 is actuated in the second direction, oil is pumped through the rotary control valve 254 and the motor 162 in a second direction. Thereby, the motor 162 and the motor shaft 62 rotate in a second direction, which operate the lawn tractor, or other vehicle, 10 in a reverse direction. The gerotor motor 162 operates as is known in the art, and it should be readily apparent to those of skill in the art that other known motors or fixed displacement motors may be used to perform this function, such as external gear, internal gear, vane, axial piston, and radial piston type motors.

FIG. 12 is a hydraulic circuit diagram illustrating oil flow through the hydraulic transmission module 14 during forward operation. Like elements to those described above with respect to FIGS. 1-11 are referenced by the same reference numerals. The circuit diagram illustrates a fluid flow path 364 through the hydrostatic transmission module, the flow path 364 preferably being substantially integrally formed in the module housing 66. During forward operation of the module 14, when the control shaft 262 is actuated to rotate the rotary control valve 254 via the directional gear 118 in a first direction, oil passes through a forward orifice 366 (defined by the openings 314, 330 of plates 282, 286) of the rotary control valve 254 to the motor 162. Oil is stored in the hydraulic fluid reservoir 78, or the sump, defined by the first chamber of the module 14. Oil is drawn from the sump 78, through the filter 102, to the fixed displacement pump 98. The oil is then pumped to the rotary control valve 254 through the valve inlet 202 (represented by point A in FIG. 12). The pressure relief valve 110 relieves pressure within the high pressure fluid passage 106 (FIG. 4) by releasing oil to the sump 78 when the system pressure exceeds a set limit, which is higher than the pressure expected during normal operations of the lawn tractor 10.

In the illustrated embodiment, the rotary control valve 254 is actuated in a first direction to allow forward operation of the module 14 when the output demand of the motor 162 is less than a maximum output. A portion of the oil flows through the forward orifice 366 of the rotary control valve 254 and a portion of the oil flows through a bypass flow path 370. For example, if output demand is 50 percent of the maximum output, 50 percent of the oil will flow through the forward orifice 366 and 50 percent of the oil will flow through the bypass flow path 370. In a further embodiment, when output demand is at the maximum output, the bypass flow path 370 is completely blocked by the flow compensating valve 114, and 100 percent of the oil will flow through the forward orifice 366.

After flowing through the forward orifice 366, the oil is pumped through the motor 162 in the forward direction such that the motor 162 rotates in the first direction, and thereby rotates the motor shaft 62 in the forward direction. The oil is then discharged back to the rotary control valve 254, where the oil flows through a reverse orifice 374 (defined by the openings 318, 334 of plates 282, 286) of the rotary control valve 254 and exits to the sump 78 through the valve outlet 278 (represented by point B in FIG. 12).

As the flow of high pressure oil passes through the forward orifice 366, a portion enters the transverse passage 900, pushes the ball 910 to the reverse orifice seat 905 and flows to the second space 210B of the flow compensating valve 114. A portion of the high pressure flow in the high pressure flow path 106 flows along a bypass flow path 370 before the high pressure oil enters the rotary control valve 254. A small portion of this flow is directed to the first portion 210A of the flow compensating valve 114. The interplay between the pressure in the first portion 210A and the pressure in the second portion 210B controls the movement of the spool 234 in the flow compensating valve 114. As illustrated in FIG. 12, a portion of the oil discharged by the pump 98 is directed through the bypass flow path 370, through the flow compensating valve, and into the sump 78.

Figure 13:
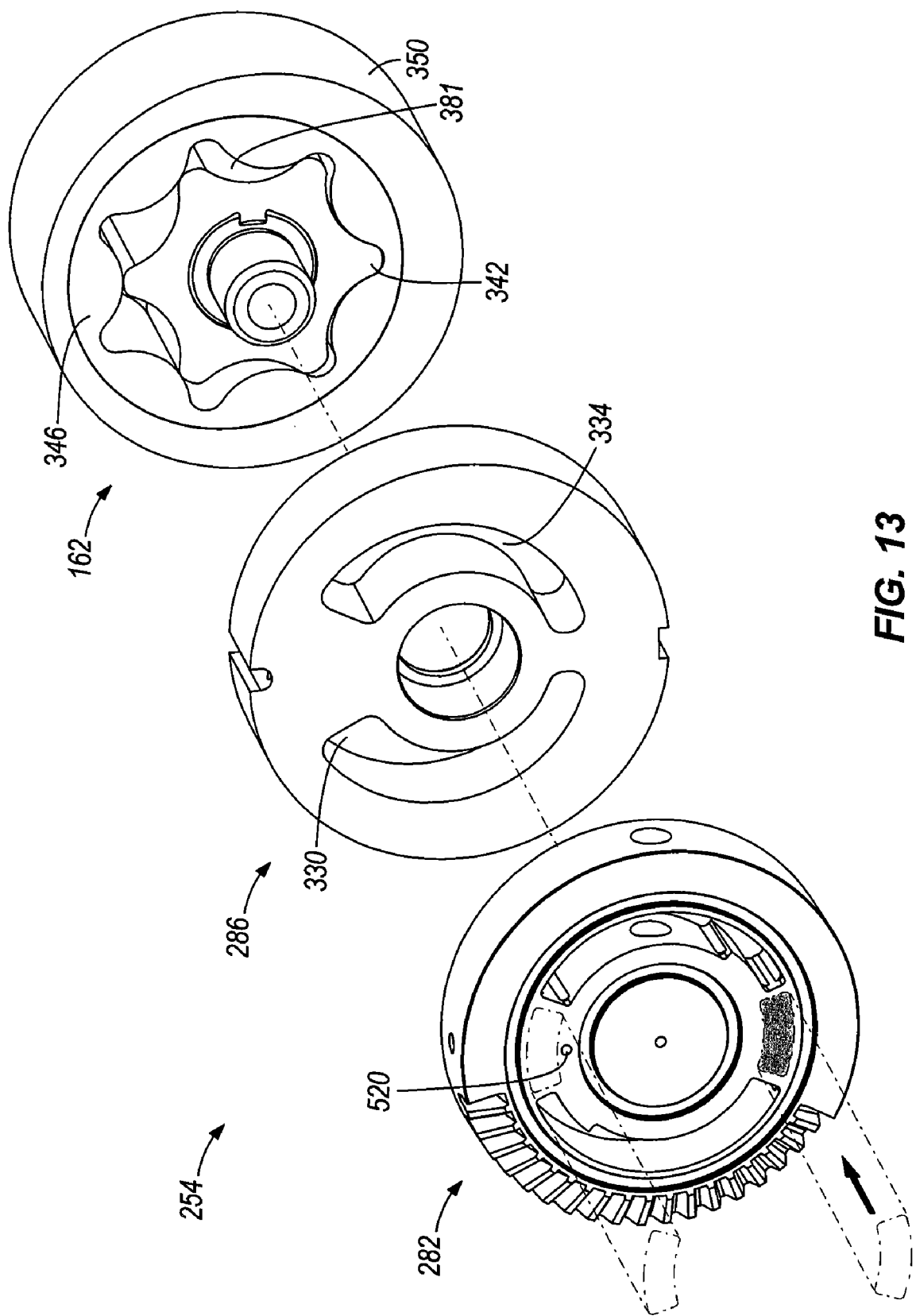
FIG. 13 illustrates the rotary control valve in a neutral position.

FIG. 13 shows an exploded view of the motor 162 and the rotary control valve 254 in a neutral position, including the rotary plate 282 and the stationary plate 286. In the neutral position, oil from the pump 98 is pumped through the housing wall 270 to the inlet 202. However, the rotary plate 282 blocks this opening and inhibits flow. In addition, the vent opening 920 is positioned adjacent the notch 281 to relieve any pressure in the second space 210B. Thus, the spool 234 moves to the bypass position to allow direct flow from the high pressure fluid passage 106 back to the housing chamber 78 without forcing the oil through the rotary valve 254 or motor 162.

In one construction, maximum output of the motor 162 in a forward direction is greater than maximum output of the motor 162 in a reverse direction to ensure the maximum forward speed is greater than the maximum reverse speed. In order to cause the transmission to operate slower in the reverse direction than in the forward direction, the rotary control valve 254 (i.e., the rotary plate 282) can be rotated about 9 degrees in a counter-clockwise direction. As discussed below, maximum forward output occurs at 30 degrees rotation in the counter-clockwise direction, which is 39 degrees from mechanical neutral, and maximum reverse output occurs at 30 degrees rotation in the clockwise direction, which is 21 degrees from mechanical neutral. It should be readily apparent to those of skill in the art that in other embodiments the initial offset and angles of rotation may vary depending on the size and configuration of the rotary control valve plates 282, 286. For example, one construction is arranged such that 60 percent of the rotation of the rotary control valve 254 is in the forward direction range (i.e., varies the speed in the forward direction) while 30 percent of the rotation of the rotary control valve 254 is in the reverse direction range (i.e., varies the speed in the reverse direction). The remaining 10 percent of the rotation is in the neutral range and does not produce a speed change.

Figure 14A:
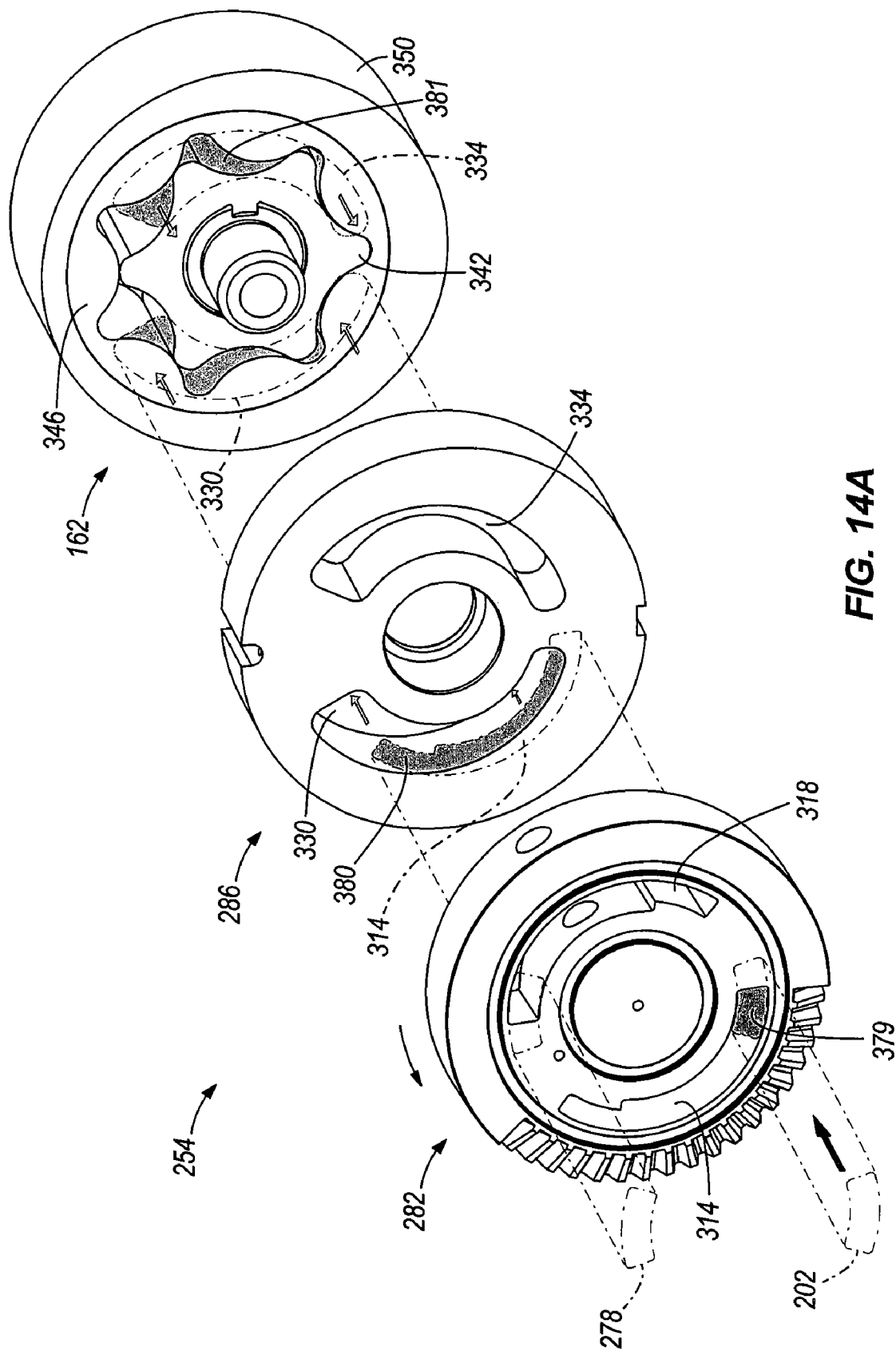
FIGS. 14A and 14B illustrate the rotary control valve in a partially open position and show fluid flow through the rotary control valve when operating in a forward direction.
Figure 14B:
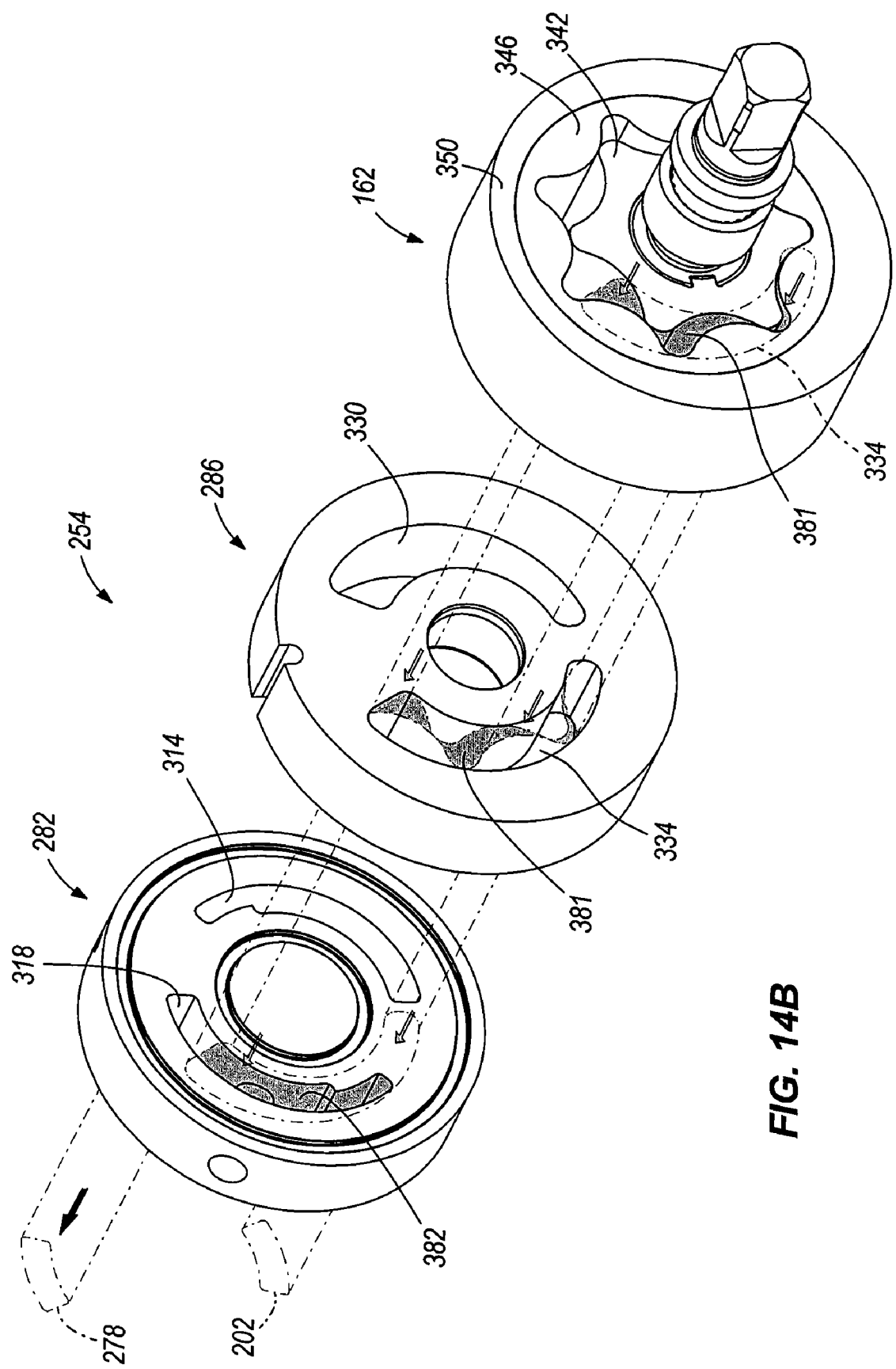

FIGS. 12, 14A, and 14B illustrate the motor 162 and the rotary control valve 254 in a forward, 50 percent output position (forward-50 position), including the rotary plate 282 and the stationary plate 286. In the forward-50 position, the rotary control valve 254 is actuated to allow the motor 162 to operate in a forward direction at 50 percent of the maximum output demand. The rotary plate 282 is rotated in a counter-clockwise direction by the directional gear 118 (FIG. 7B) such that a portion of the forward opening 314 of the rotary plate 282 overlaps the first opening 330 of the stationary plate 286 and the valve inlet 202. In this position, a portion of the reverse opening 318 of the rotary plate 282 overlaps the second opening 334 of the stationary plate 286 and the valve outlet 278. In the illustrated embodiment, the rotary plate 282 is rotated about 10.5 degrees in a counter-clockwise direction from the neutral position (19.5 degrees from mechanical neutral) to achieve 50 percent output demand, with other rotational angles also being possible.

FIG. 14A shows oil flow through the rotary control valve 254 to the motor 162, and FIG. 14B shows oil flow back through the rotary control valve 254 from the motor 162. Referring to FIG. 14A, oil enters the forward opening 314 of the rotary plate 282 from the valve inlet 202 (FIG. 7B). Overlap portion 379 between the forward opening 314 and the inlet 202 is shown by a shaded area. Oil fills the forward opening 314 of the rotary plate 282 and enters the first opening 330 of the stationary plate 286, which overlaps the forward opening 314. Overlap portion 380 between the forward opening 314 and the first opening 330 are shown by a shaded area.

After filling the first opening 330 of the stationary plate 286, the oil enters the motor 162 and is pumped through the motor 162 to cause rotation of the motor shaft 62. Referring to FIG. 14B, oil discharged from the motor 162 enters the second opening 334 of the stationary plate 286, which is shown by a shaded overlap portion 381. The oil fills the second opening 334 of the stationary plate 286 and then exits to the reverse opening 318 of the rotary plate 282, which overlaps the outlet 278. Overlap portion 382 between the second opening 334 and the reverse opening 318 is shown by a shaded area. Oil fills the reverse opening 318 of the rotary plate 282 and enters the valve outlet 278 to the sump 78.

In operation, about 50 percent or another portion of the oil bypasses the motor 162 and returns to the sump 78 via the flow compensation valve 114. It should be readily apparent to those of skill in the art that the discussion with respect to the forward-50 position is applicable to other forward output demands less than the maximum output, i.e., when the rotary plate 282 is rotated in a counter-clockwise direction from the mechanical neutral position between 0 degrees and 30 degrees.

FIG. 15 is a hydraulic circuit diagram illustrating oil flow through the hydraulic transmission module 14 during reverse operation, which is similar to the hydraulic circuit during forward operation. Like elements to those described above with respect to FIGS. 1-12 are referenced by the same reference numerals. Much of FIG. 15 is identical to FIG. 12, as such, these portions will not be discussed in detail. The rotation of the rotary plate 282 in the opposite direction as it rotates in the illustration of FIG. 12 results in the inlet 202 directing oil through the reverse orifice 374, through the motor 162 and back through the forward orifice 366. Because the high pressure oil now passes through the reverse orifice 374 first, the high pressure oil forces the ball 910 to the forward side seat 905 such that the high pressure fluid still fills the transverse aperture 900. Thus, the present system is able to operate in both forward and reverse by simply rotating the rotary plate 282 in the opposite direction.

Figure 16A:
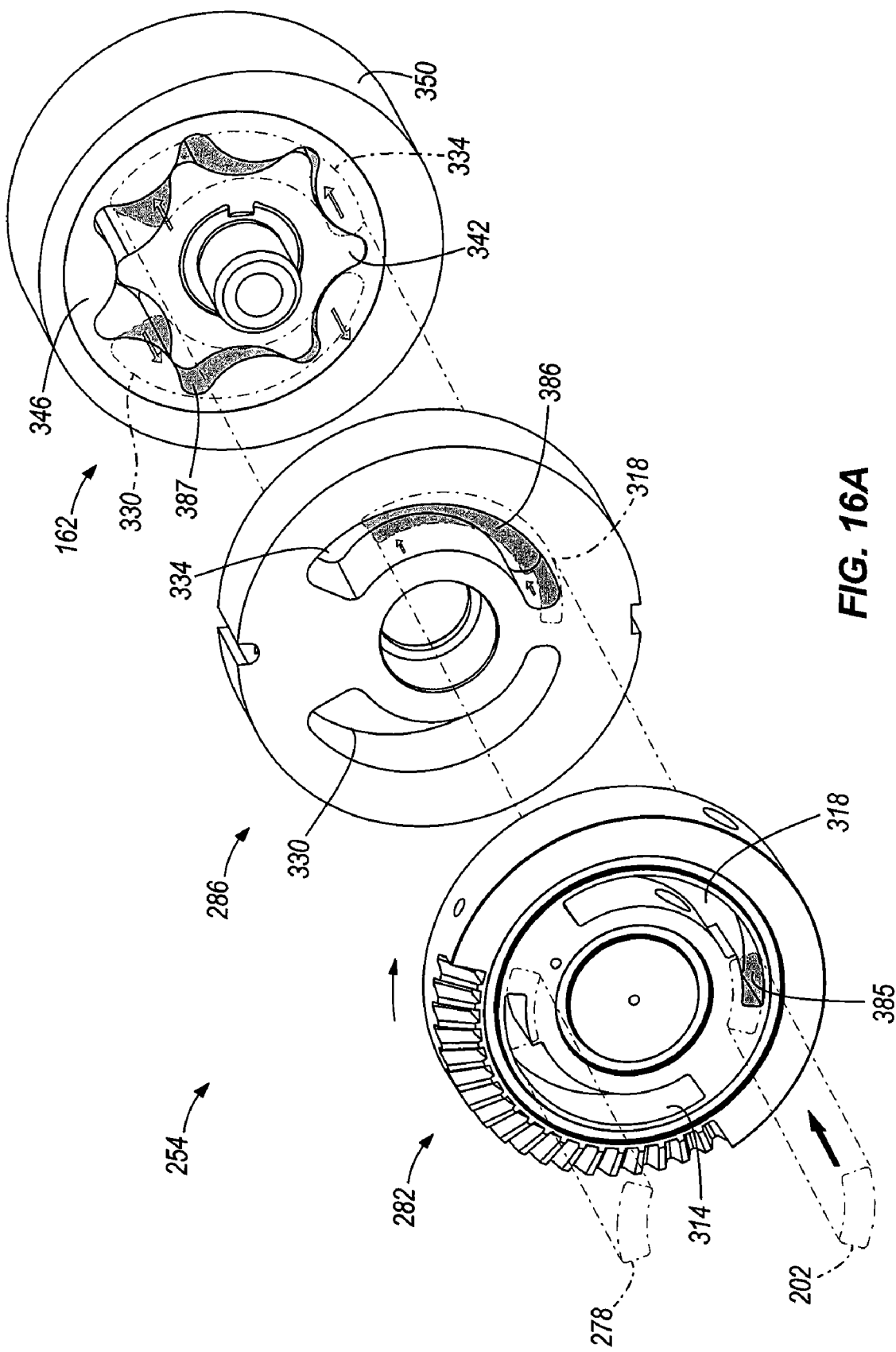
FIGS. 16A and 16B illustrate the rotary control valve in a partially open position and show fluid flow through the rotary control valve when operating in a reverse direction.
Figure 16B:
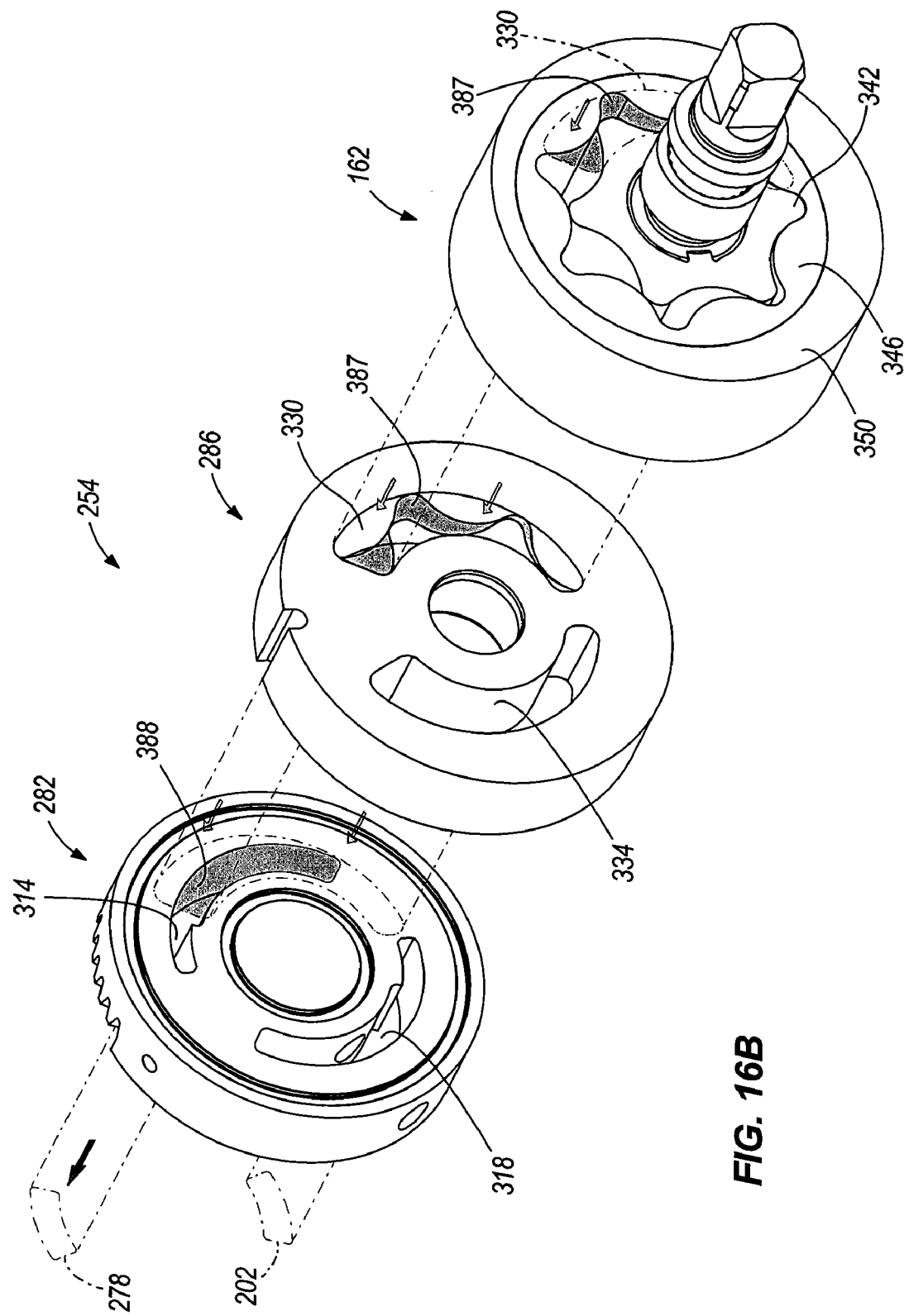

FIGS. 16A and 16B illustrate the motor 162 and the rotary control valve 254 in a reverse, 50 percent output position (reverse-50 position), including the rotary plate 282 and the stationary plate 286. In the reverse-50 position, the rotary control valve 254 is actuated to allow the motor 162 to operate in a reverse direction at 50 percent of the maximum output demand. The rotary plate 282 is rotated in a clockwise direction by the directional gear 118 (FIG. 7B). A portion of the reverse opening 318 of the rotary plate 282 overlaps the second opening 334 of the stationary plate 286 and the valve inlet 202, and a portion of the forward opening 314 of the rotary plate 282 overlaps the first opening 330 of the stationary plate 286 and the valve outlet 278. In the illustrated embodiment, the rotary plate 282 is rotated about 19.5 degrees in a clockwise direction from the neutral position (i.e., 10.5 degrees from mechanical neutral) to achieve 50 percent output demand.

FIG. 16A shows oil flow through the rotary control valve 254 to the motor 162, and FIG. 16B shows oil flow back through the rotary control valve 254 from the motor 162. Referring to FIG. 16A, oil enters the reverse opening 318 of the rotary plate 282 from the valve inlet 202 (FIG. 7B). Overlap portion 385 between the inlet 202 and the reverse opening 318 is shown by a shaded area. Oil fills the reverse opening 318 of the rotary plate 282 and enters the second opening 334 of the stationary plate 286, which overlaps the reverse opening 318. Overlap portion 386, between the reverse opening 318 and the second opening 334, is shown by a shaded area.

After exiting the second opening 334 of the stationary plate 286, the oil enters the motor 162 and is pumped through the motor 162 to cause reverse rotation of the motor shaft 62. Referring to FIG. 16B, oil discharged from the motor 162 enters the first opening 330 of the stationary plate 286, which is shown by a shaded overlap portion 387. The oil fills the first opening 330 of the stationary plate 286 and then exits to the forward opening 314 of the rotary plate 282, which overlaps a portion of the first opening 330. Overlap portion 388, between the first opening and the forward opening 330, is shown by a shaded area. Oil fills the forward opening 314 of the rotary plate 282 and enters the valve outlet 278 to the sump 78 such that oil exits the rotary plate 282 to the sump 78, as shown by the arrow 384.

In operation of the transmission, a portion of the oil, about 50 percent in the illustrated embodiment, bypasses the motor 162 and returns to the sump 78 via the flow compensating valve 114. It should be readily apparent to those of skill in the art that the discussion with respect to the reverse-50 position is applicable to other output demands less than the maximum output, i.e., when the rotary plate 282 is rotated in a clockwise direction from the mechanical neutral position between 0 degrees and 30 degrees.

It should be noted that the illustrated construction includes a substantially fixed volume housing that contains the various components as well as the oil. During operation of the transmission, the oil becomes heated and expands. To accommodate the expansion, the housing can be made slightly larger or an expansion tank or expansion chamber can be attached to the housing. In arrangements that employ an attachable tank, it is convenient to attach the tank to a fill port or opening such as fill port 990 illustrated in FIG. 3.

As illustrated in FIGS. 1 and 2, the illustrated hydrostatic transmission 14 drives the differential 18 that in turn drives two wheels 46 of the vehicle 10. One possible differential 18 suitable for use with the illustrated transmission 14 is shown in FIGS. 19-23.

The drive shaft 22 extends between the transmission 14 and the differential 18 and provides a rotational connection between the transmission 14 and the differential 18. The shaft 22 includes a first end 400 coupled to the transmission 14 and a second end 405 coupled to the differential 18. The first end 400 may also include a fan 410 that rotates with the shaft 22 to direct cooling air onto the transmission 14 and/or the differential 18.

Figure 19:
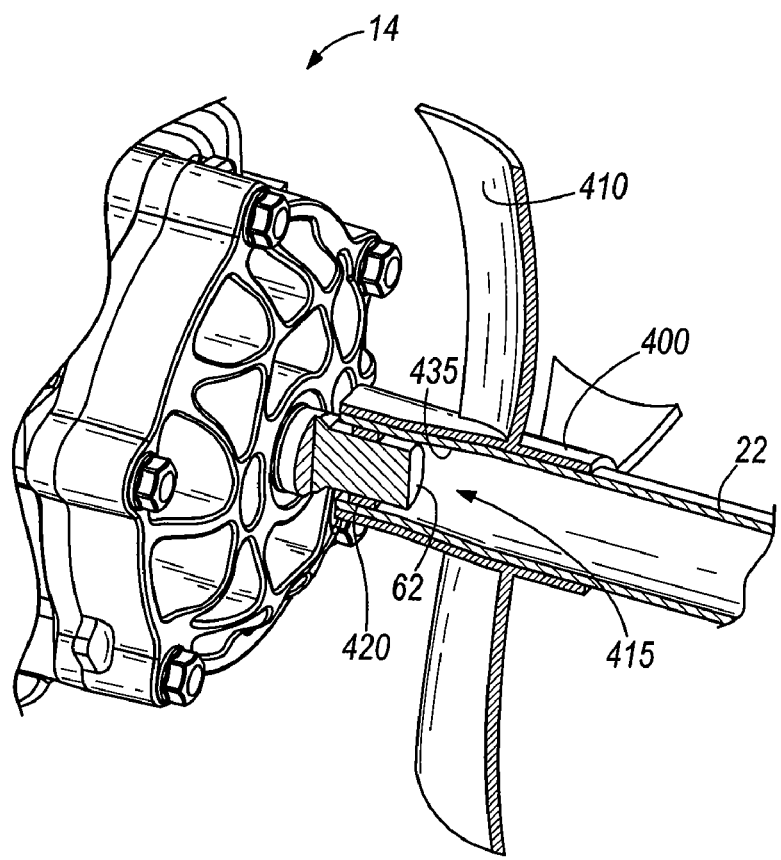
FIG. 19 is a perspective view of an end of the drive shaft shown in FIG. 2, in particular an end of the drive shaft coupled to the hydrostatic transmission.

With reference to FIG. 19, the first end 400 includes a hollow portion 415 that defines a substantially rectangular or square cross section. The transmission 14 includes a motor shaft 62 that is substantially solid and defines a smaller rectangular or square cross section that fits within the hollow portion 415. A rectangular or square bushing 420 includes an inner surface 425 that engages the motor shaft 62 and an outer surface 430 that engages an inner surface 435 of the shaft 22. The bushing 420 interconnects the motor shaft 62 and the shaft 22 for rotation.

In preferred constructions, the second end 405 is substantially similar to the first end 400, and a second bushing (similar to bushing 420) interconnects the shaft 22 and a differential input shaft 440. It should be noted that while a rectangular or square bushing 420, motor shaft 62, and shaft hollow portion 415 are illustrated, other shapes could be employed. For example, an oval or elliptical shape could also be employed if desired. So long as the shape is capable of transmitting torque between the interconnected shafts, the shape could be employed for a bushing, motor shaft, and the drive shaft hollow portion.

Figure 20:
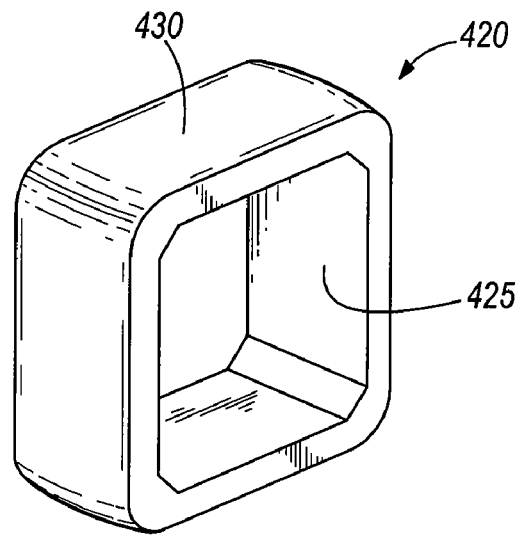
FIG. 20 is a perspective view of a bushing used to interconnect a motor output shaft and a drive shaft.

FIG. 20 illustrates the first bushing 420 in greater detail. In preferred constructions, the second bushing is substantially the same as the first bushing 420. However, different sizes or shapes could be employed for the first or second bushing if desired.

The inner surface 425 of the bushing 420 is substantially square such that it can closely engage the square motor shaft 62. Once engaged with the motor shaft 62, the square bushing 420 is inhibited from rotating relative to the motor shaft 62. Similarly, the outer surface 430 of the bushing 420 is square such that it closely engages the square inner surface 435 of the shaft 22. Thus, the bushing 420 is inhibited from rotating relative to the shaft 22. In this way, the bushing 420 couples to two shafts 62, 22 together to transfer torque therebetween.

The outer surfaces 430 of the bushing 420 are slightly curved in the axial direction. The curve allows for slight radial and axial misalignment between the two shafts 22, 62. Thus, in addition to transferring torque, the bushing 420 allows the shafts 22, 62 to be slightly misaligned or to change alignment slightly during vehicle operation. Furthermore, the use of the bushing 420 and a substantially hollow shaft 22 allows for variation in the axial distance between the transmission 14 and the differential 18. Specifically, if the differential 18 is slightly closer to the transmission 14, different lengths of the drive shaft 22 and the differential shaft 440 extend into the hollow portion 415 of the shaft 22. The use of an open bushing 420 such as the one illustrated in FIG. 20 allows for variations in axial spacing as well as axial misalignment.

Figure 21:
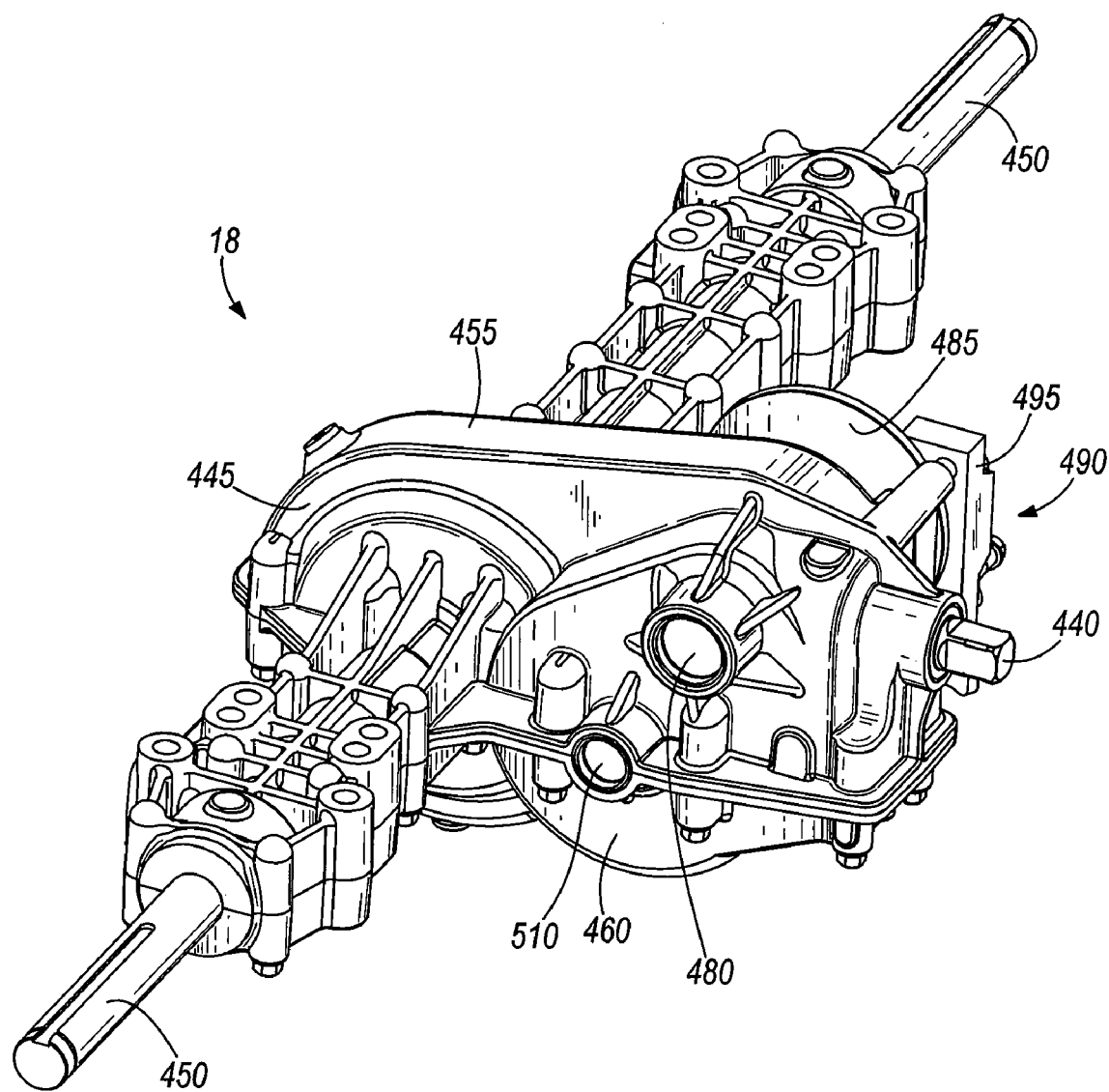
FIG. 21 is a perspective view of a differential according to one embodiment of the invention.

FIG. 21 illustrates one possible differential 18 suitable for use with the vehicle 10. The differential 18 includes a housing 445 that at least partially supports the input shaft 440 and two axles 450 that extend substantially normal to the input shaft 440 and support two wheels 46. In the illustrated construction, the housing 445 is formed from a first piece 455 and a second piece 460 that bolt together to define an inner chamber 465. Generally, the housing 445 is cast from a metallic material such that the housing 445 provides some level of protection for the components inside. However, other manufacturing methods (e.g., forging, welding, machining, etc.) as well as combinations of manufacturing methods are also suitable for use in manufacturing the housing 445. Although a metal housing is preferred, (e.g., cast aluminum, cast iron, cast steel, stainless steel, and the like) other materials may also be suitable for use.

Figure 22:
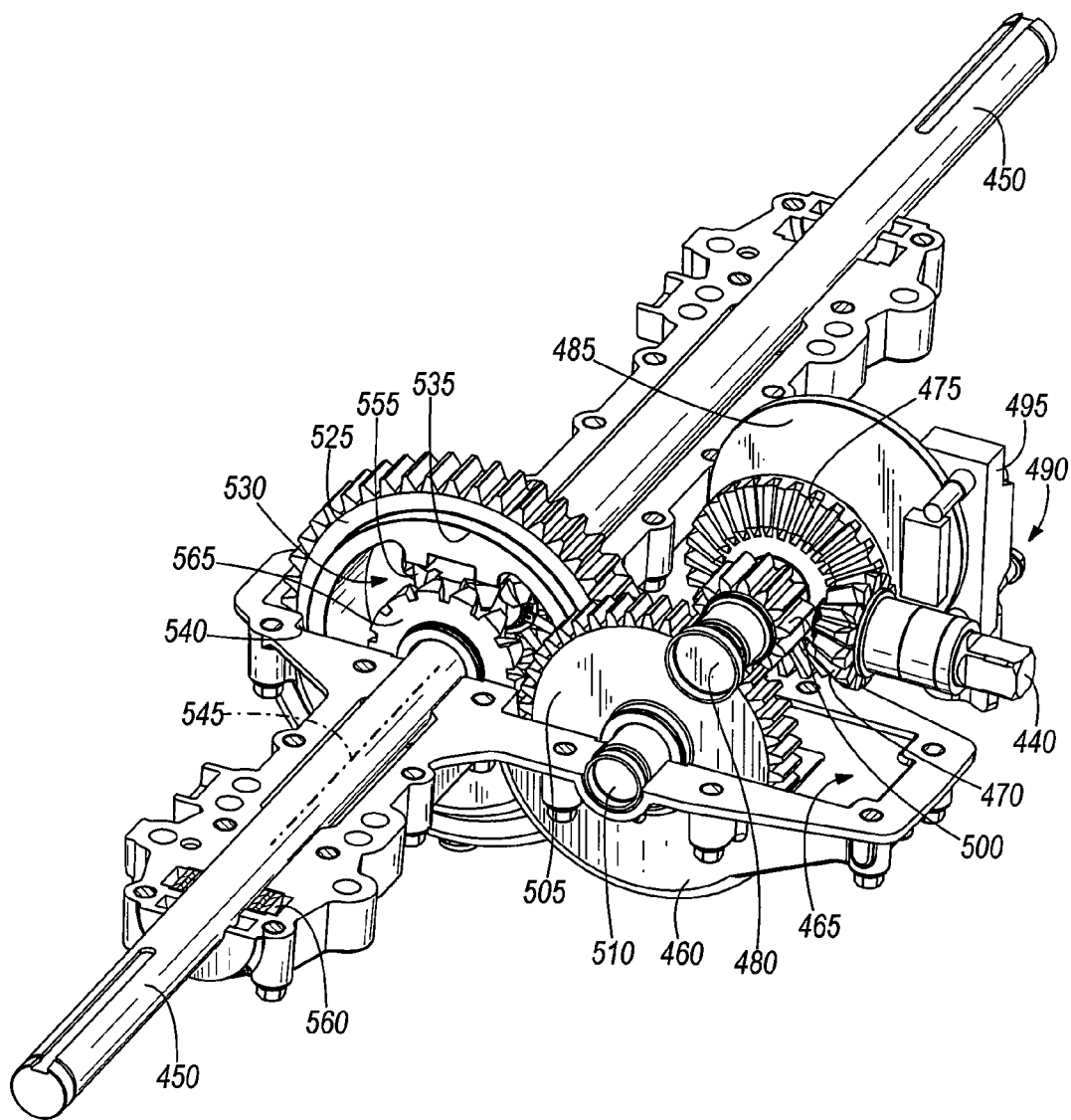
FIG. 22 is a perspective view of the differential shown in FIG. 21 with a portion of the housing removed.

FIG. 22 shows the differential 18 of FIG. 21 with the first piece 455 of the housing 445 removed to better illustrate the components disposed within the inner chamber 465. As can be seen, the first piece 455 provides rotational support for the differential input shaft 440. In most constructions, one or more bearings are positioned between the housing 445 and the input shaft 440 to facilitate smooth rotation of the input shaft 440. A first bevel gear 470 is supported at the end of the input shaft 440 such that the first bevel gear 470 rotates at the same speed as the input shaft 440.

The first bevel gear 470 engages a second bevel gear 475 that is larger than the first bevel gear 470. The larger second bevel gear 475 provides a first stage of speed reduction in the differential 18. The second bevel gear 475 is supported for rotation by a first differential shaft 480 that is substantially normal to the input shaft 440. The first differential shaft 480 is supported for rotation by the first piece 455 of the housing 445. As with the input shaft 440, most constructions include one or more bearings disposed between the first piece 455 and the first differential shaft 480 to facilitate efficient rotation.

With reference to FIGS. 21 and 22, a brake disk 485 is supported by the first differential shaft 480 and is disposed outside of the housing 445 to facilitate engagement by a brake member 490. The brake member 490 may include one or more calipers 495 coupled to the housing 445 or to the vehicle 10 that are used by the rider to slow the vehicle 10.

Returning to FIG. 22, the first differential shaft 480 also supports a first gear 500. Because of the first stage of speed reduction, the first gear 500, which rotates at the same speed as the first differential shaft 480, rotates slower than the differential input shaft 440. As illustrated, the first gear 500 is a spur gear. However, other constructions may employ helical or other gear arrangement as desired.

A second gear 505 engages the first gear 500 and rotates in response to rotation of the first gear 500. As shown in FIG. 22, the second gear 505 is much larger than the first gear 500 to provide a second stage of speed reduction. The second gear 505 is also illustrated as a spur gear, with other gears being suitable for use. The second gear 505 is supported on a second differential shaft 510 that is supported for rotation by the first and second pieces 455, 460 of the housing 445. In most constructions, the second differential shaft 510 is supported by the housing 445, and gears 505, 515 rotate with respect to the shaft 510.

The second differential shaft 510 is substantially parallel to the first differential shaft 480 and is disposed slightly below the first differential shaft 480. As illustrated in FIG. 22, the axis of the second differential shaft 510 is positioned near the interface between the first piece 455 and the second piece 460 of the housing 445.

A third gear 515 is attached to the second differential shaft 510 and is positioned adjacent the second gear 505. The third gear 515 is a spur gear that is smaller than the second gear 505. The third gear 515 is fixedly attached to the second differential shaft 510 such that the third gear 515 and the second gear 505 rotate in unison. In addition, because the third gear 515 is fixedly attached to the second differential shaft 510, the third gear cannot move axially along the second differential shaft 510.

Figure 23:
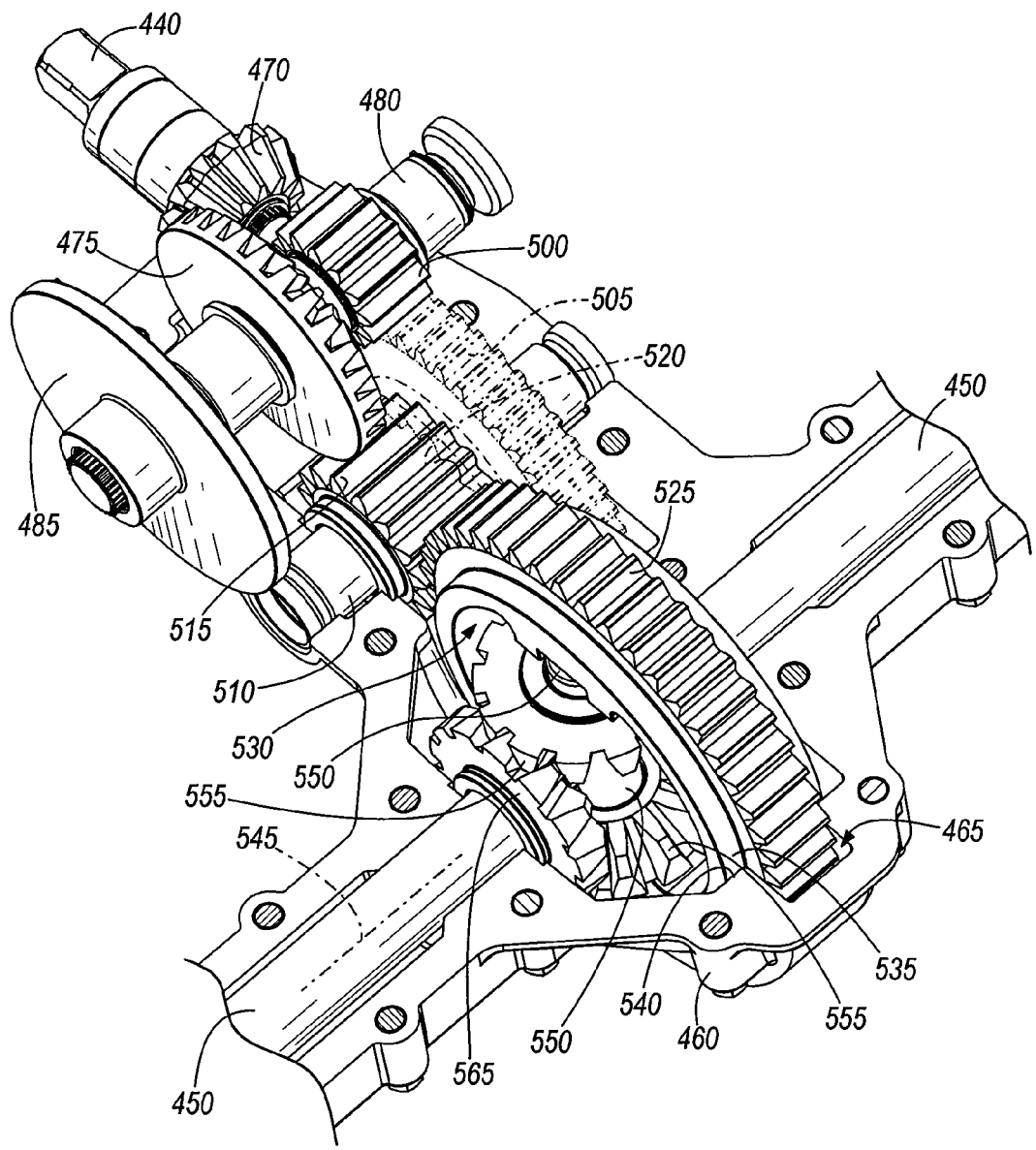
FIG. 23 illustrates an arrangement of gears within the differential shown in FIG. 22.

FIG. 23 illustrates the arrangement of the second gear 505 and the third gear 515, with the second gear 505 illustrated in phantom. The second gear 505 includes a central aperture 520 sized and shaped to receive the teeth of the third gear 515. When the teeth of the third gear 515 engage the aperture 520 of the second gear 505, the second gear 505 becomes rotationally locked to the third gear 515 and the second differential shaft 510 such that rotation of the second gear 505 produces a corresponding rotation of the third gear 515. However, the arrangement is such that the second gear 505 can move axially along the second differential shaft 510 with respect to the third gear 515, while remaining engaged for rotation. This arrangement eliminates the need for a splined or other shaft that allows for axial movement of one of the two gears 505, 515 on the second differential shaft 510.

Returning to FIG. 23, the third gear 515 engages a fourth, or ring gear 525 that is larger than the third gear 515. The sizing of the third gear 515 and the ring gear 525 results in a third stage of speed reduction. The ring gear 525 includes spur gear teeth on an outer surface of a ring that defines a substantially hollow ring interior 530.

In some constructions, the ring gear 525 includes a shoulder 535 (FIG. 23) that engages a corresponding shoulder 540 formed as part of the housing 445. The engaged shoulders 535, 540 act as a bearing (i.e., a journal bearing) that supports the ring gear 525 for rotation about a ring gear axis 545. In other constructions, other support systems are employed to support the ring gear 525 as will be discussed below.

Two shafts 550 extend toward one another along a diameter of the ring gear 525 within the ring interior 530 and support two ring bevel gears 555 for rotation. Each of the ring bevel gears 555 is rotatably attached to one of the shafts 550 such that the ring bevel gears 555 are free to rotate about or with their respective shafts 550. In most constructions, bearings support the bevel gears 555 on the shafts 550 within the ring gear 525 to facilitate smooth reduced friction rotation.

The two axles extend from the housing 445 and support wheels 46 (shown in FIG. 1) that in turn support the vehicle 10. The axles 450 extend along the ring gear axis 545 and are substantially parallel to the first differential shaft 480 and the second differential shaft 510. An outer bearing 560, positioned between the housing 445 and the respective axle 450 near the point where the axle 450 exits the housing 445, at least partially supports each axle 450 for rotation. Inner bearings (not shown) may be employed to further support each axle 450 in constructions that do not employ a shoulder 535 on the ring gear 525. In these constructions, the inner bearings are positioned between the housing 445 and the axle 450 near the inner chamber 465.

Each axle 450 includes an axle bevel gear 565 disposed at its inner end and engaged with the ring bevel gears 555. In the illustrated construction, the axle bevel gears 565 are substantially the same size as the ring bevel gears 555. Of course, other sizes and gear types may be suitable.

The ring bevel gears 555 rotate with the ring gear 525, but do not rotate about the ring gear shafts 550 during straight travel of the vehicle 10. Rotation of the ring bevel gears 555 with the ring gear 550 causes rotation of the axle bevel gears 565 and rotation of the vehicle wheels 46. During a turn, the inner wheel 46 rotates more slowly than the outer wheel 46. To facilitate this, the ring bevel gears 555 rotate about the ring shafts 550, thereby allowing the axle bevel gear 565 associated with the inner wheel 46 to rotate slower than the axle bevel gear 565 associated with the outer wheel 46.

In most constructions, the cavity or inner chamber 465 is filled, or partially filled with a lubricant, such as oil. The lubricant reduces wear of the interfacing components and gears and transfers excess heat away from these components. In addition, the differential 18 has been described as including several bearings. Journal, needle, roller, ball, tapered roller bearings, and the like could be used for any or all of the bearings described.

In operation, the transmission provides power to the motor output shaft 62 in the form of a torque at an output speed. The torque is transferred from the motor output shaft 62 to the drive shaft 22 via the bushing 420. Any shaft misalignment is accommodated by the bushing 420. The torque is then transferred to the differential input shaft 440 such that the differential input shaft 440 rotates at a first speed substantially equal to the speed of the motor output shaft 62. Again, a second bushing 420 between the drive shaft 22 and the differential input shaft 440 accommodates minor axial misalignments, while efficiently transmitting torque between the shafts 22, 440.

The rotation of the differential input shaft 440 causes the first bevel gear 470 to rotate at the same speed as the differential input shaft 440. The first bevel gear 470 is engaged with the second bevel gear 475 and causes a corresponding rotation. Because the second bevel gear 475 is larger than the first bevel gear 470, the second bevel gear 475 rotates at a second speed that is lower than the first speed. In the illustrated construction, the second bevel gear 475 is approximately twice the diameter of the first bevel gear 470, thus producing a speed reduction of approximately one-half.

The first spur gear 500 rotates at the second speed with the second bevel gear 475 and engages the second spur gear 505. The second spur gear 505 is larger than the first spur gear 500, thus producing another speed reduction. In the illustrated construction, the second spur gear 505 is approximately three times the diameter of the first spur gear 500. As such, the second spur gear 505 rotates at a third speed that is approximately one-third the second speed.

The third spur gear 515 is rotationally coupled to the second spur gear 505 such that the third spur gear 515 rotates at the third speed. The third spur gear 515 engages the ring gear 525 such that the ring gear 525 rotates in response to rotation of the third spur gear 515. The ring gear 525 is larger than the third spur gear 515, thus producing a third stage of speed reduction. In the illustrated construction, the ring gear 525 has a diameter that is approximately four times the diameter of the third spur gear 515. Thus, the ring gear 525 rotates at about one-quarter the speed of the third spur gear 515.

The illustrated construction provides a speed reduction of about 24 to 1Thus, when the differential input shaft 440 rotates at 2400 rpm, the ring gear 525 rotates at about 100 rpm. In addition to the reduction in speed, there is a corresponding increase in torque at the ring gear 525.

During straight-line operation of the vehicle 10, rotation of the ring gear 525 produces a corresponding rotation of the ring bevel gears 555. However, the ring bevel gears 555 do not rotate about the ring gear shafts 550. As such, the ring bevel gears 555 couple the axle bevel gears 565 to the ring gear 525 such that the axle bevel gears 565 rotate at substantially the same speed as the ring gear 525. In addition, the axles 450 and the wheels 46 attached to the axles 450 rotate at substantially the same speed as the ring gear 525.

During a turn, one of the wheels 46, axles 450, and axle bevel gears 565 must rotate slightly slower than the opposite wheel 46, axle 450, and axle bevel gear 565. To facilitate this, the ring bevel gears 555 rotate about the ring shaft axis 545. The rotation of the ring bevel gears 555 allows one axle bevel gear 565 to rotate slower than the ring gear 525, while simultaneously allowing the opposite axle bevel gear 565 to rotate faster.

While the illustrated construction includes spur gears and bevel gears, one of ordinary skill in the art will realize that other types of gears (e.g., helical, etc.) could be employed. Furthermore, additional components not described herein may also be included in the transmission 14 or differential 18.

Various features and advantages of the invention are set forth in the following claims.

What is claimed is:

1. A rotary control valve for a vehicle hydrostatic transmission, the hydrostatic transmission having a hydraulic pump and a hydraulic motor, the valve being configured to control both a direction and a speed of the hydrostatic transmission, the rotary control valve comprising:
a rotary valve plate configured to oscillate through a range of less than 180 degrees independently of the pump and the motor.

2. The rotary control valve of claim 1, further comprising an operator interface and linkage between the interface and the control valve, the operator interface configured to enable an operator to control the control valve.

3. The rotary control valve of claim 2, wherein the valve includes a valve gear, and wherein the linkage includes a lever and a second gear that engages the valve gear.

4. The rotary control valve of claim 3, wherein the valve gear is a bevel gear affixed to the valve plate, and wherein the second gear is a pinion gear.

5. The rotary control valve of claim 2, wherein the operator interface includes a shifter.

6. The rotary control valve of claim 5, wherein the linkage includes a push and pull cable.

7. The rotary control valve of claim 2, wherein the operator interface includes a foot pedal.

8. The rotary control valve of claim 2, wherein the valve plate is configured to oscillate through a range of about 40 to 80 degrees.

9. The rotary control valve of claim 8, wherein the valve plate is configured to oscillate about 20 to 40 degrees in both directions from a neutral position.

10. The rotary control valve of claim 1, further comprising a bevel gear integrally formed as one piece with the valve plate.

11. The rotary control valve of claim 10, wherein the valve plate is formed from sintered metal.

12. The rotary control valve of claim 10, wherein the bevel gear is made from at least one of a plastic material, a metal material, a sintered metal, or a cast metal.

13. The rotary control valve of claim 1, further comprising a bevel gear having a gear axis of rotation, and wherein the valve plate has a plate axis of rotation that is parallel to the gear axis of rotation.

14. The rotary control valve of claim 13, wherein the gear axis of rotation and the plate axis of rotation are substantially coincident.

15. The rotary control valve of claim 1, further comprising a stationary valve plate disposed adjacent the rotary valve plate, the stationary valve plate including a first aperture that is in fluid communication with a first side of the motor and a second aperture that is in fluid communication with a second side of the motor.

16. The rotary control valve of claim 15, wherein the rotary valve plate includes a first movable aperture and a second movable aperture positioned such that rotation of the rotary valve plate in a first direction establishes a first fluid flow path from a high pressure inlet to an outlet to produce forward rotation of the motor, the first fluid flow path passing in order through the first movable aperture, the first aperture, the first side of the motor, the second side of the motor, the second aperture, and the second movable aperture, and rotation of the rotary valve plate in a second direction establishes a second fluid flow path from the high pressure inlet to the outlet to produce reverse rotation of the motor, the second fluid flow path passing in order through the second movable aperture, the second aperture, the second side of the motor, the first side of the motor, the first aperture, and the first movable aperture.

* * * * *